United States Patent
Ho et al.

(10) Patent No.: US 7,755,817 B2
(45) Date of Patent: Jul. 13, 2010

(54) COLOR GAMUT MAPPING

(75) Inventors: I-Lin Ho, Kaohsiung (TW); Peng Kuo-Shiuan, Hsinchu (TW); Chang Chia Ping, Jiali Township, Tainan County (TW); Chung Jun Shih, Taichung (TW)

(73) Assignee: Chimei Innolux Corporation, Miao-Li County (TW)

( * ) Notice: Subject to any disclaimer, the term of this patent is extended or adjusted under 35 U.S.C. 154(b) by 1568 days.

(21) Appl. No.: 11/007,516

(22) Filed: Dec. 7, 2004

(65) Prior Publication Data

US 2006/0119870 A1    Jun. 8, 2006

(51) Int. Cl.
G03F 3/08  (2006.01)
G06F 15/00  (2006.01)
G06K 9/00  (2006.01)

(52) U.S. Cl. .......................... 358/523; 358/1.9; 382/162

(58) Field of Classification Search .................. 358/1.9, 358/520, 523, 524, 518, 535, 539, 167, 162; 345/590, 600
See application file for complete search history.

(56) References Cited

U.S. PATENT DOCUMENTS

| | | | | |
|---|---|---|---|---|
| 5,243,414 A | * | 9/1993 | Dalrymple et al. | 358/500 |
| 5,268,754 A | * | 12/1993 | Van de Capelle et al. | 358/527 |
| 5,390,035 A | * | 2/1995 | Kasson et al. | 358/518 |
| 5,625,378 A | * | 4/1997 | Wan et al. | 345/600 |
| 5,721,572 A | | 2/1998 | Wan et al. | |
| 5,751,926 A | * | 5/1998 | Kasson et al. | 345/419 |
| 6,724,500 B1 | * | 4/2004 | Hains et al. | 358/1.9 |
| 6,724,507 B1 | | 4/2004 | Ikegami et al. | |
| 6,778,185 B1 | | 8/2004 | Moroney | |
| 7,142,710 B2 | * | 11/2006 | Hung | 382/162 |
| 7,167,277 B2 | * | 1/2007 | Shimizu et al. | 358/1.9 |
| 7,215,440 B2 | * | 5/2007 | Klassen et al. | 358/1.9 |
| 7,230,737 B1 | * | 6/2007 | Ohga | 358/1.9 |
| 7,233,413 B2 | * | 6/2007 | Jones et al. | 358/1.9 |
| 7,239,422 B2 | * | 7/2007 | Braun et al. | 358/1.9 |
| 7,251,058 B2 | * | 7/2007 | Pop | 358/1.9 |
| 7,403,205 B2 | * | 7/2008 | Zeng | 345/590 |
| 7,403,315 B2 | * | 7/2008 | Tsuji et al. | 358/523 |
| 7,411,701 B2 | * | 8/2008 | Boll | 358/1.9 |
| 7,440,136 B2 | * | 10/2008 | Matsuoka et al. | 358/1.9 |
| 7,446,899 B2 | * | 11/2008 | Matsuoka | 358/1.9 |

(Continued)

OTHER PUBLICATIONS

Amidror, Isaac, "Scattered data interpolation methods for electronic imaging systems: a survey", Journal of Electronic Imaging, 11(2), 157-176, Apr. 2002.

(Continued)

*Primary Examiner*—Madeleine A Nguyen
(74) *Attorney, Agent, or Firm*—Fish & Richardson P.C.

(57) ABSTRACT

Mapping of color gamut in a three-dimensional color space is performed by converting coordinates of source reference points to coordinates of destination reference points, and converting coordinates of an initial point to coordinates of a target point based on a first relationship among a first set of volumes and a second relationship among a second set of volumes. The first set of volumes are defined at least in part by the initial point and at least a subset of the source reference points, and the second set of volumes are defined at least in part by the target point and at least a subset of the destination reference points.

33 Claims, 12 Drawing Sheets

U.S. PATENT DOCUMENTS

| | | | | |
|---|---|---|---|---|
| 7,602,537 | B2* | 10/2009 | Henley et al. | 358/520 |
| 7,652,789 | B2* | 1/2010 | Berns et al. | 358/1.9 |
| 2002/0101456 | A1* | 8/2002 | Matsuoka et al. | 345/848 |
| 2003/0098986 | A1* | 5/2003 | Pop | 358/1.9 |
| 2003/0138142 | A1* | 7/2003 | Hung | 382/162 |
| 2004/0096104 | A1* | 5/2004 | Terekhov | 382/167 |
| 2004/0252885 | A1* | 12/2004 | Gondek et al. | 382/162 |
| 2005/0084150 | A1 | 4/2005 | Shan et al. | |
| 2005/0146736 | A1* | 7/2005 | Matsuoka et al. | 358/1.9 |
| 2006/0012811 | A1* | 1/2006 | Dalrymple et al. | 358/1.9 |
| 2006/0280360 | A1* | 12/2006 | Holub | 382/162 |

OTHER PUBLICATIONS

Barber et al., "The Quickhull Algorithm for Convex Hulls", ACM Transactions on Mathematical Software, vol. 22, No. 4, pp. 469-483, Dec. 1996.

Braun et al., "Color Gamut Mapping in a Hue-Linearized CIELAB Color Space", Rochester Institute of Technology, Rochester, NY, Nov. 1998.

Ebner, F. and Fairchild, M.D., "Finding Constant Hue Surfaces in Color Space", Proceedings of SPIE, Color Imaging: Device-Independent Color, Color Hardcopy, and Graphic Arts III, vol. 3300, pp. 107-117, Jan. 1998.

Hung, P. and Berns, R.S., "Determination of Constant Hue Loci for a CRT Gamut and Their Predictions Using Color Appearance Spaces", Color Research and Application, vol. 20, No. 5, pp. 285-295, Oct. 1995.

Kotera et al., "Compact Description of 3D Image Gamut by Singular Value Decomposition", IS&T/SID Ninth Color Imaging Conference, pp. 55-61, Nov. 2001.

Marcu, Gabriel, "Gamut Mapping in Munsell Constant Hue Sections", The Sixth Color Imaging Conference: Color Science, Systems and Applications, pp. 159-162, Nov. 1998.

Morovic et al., "Calculating Medium and Image Gamut Boundaries for Gamut Mapping", Color Research and Application, pp. 394-401, Oct. 2000.

Morovic et al., "The Fundamentals of Gamut Mapping: A Survey", Journal of Imaging Science and Technology, pp. 1-36, Jul. 2000.

* cited by examiner

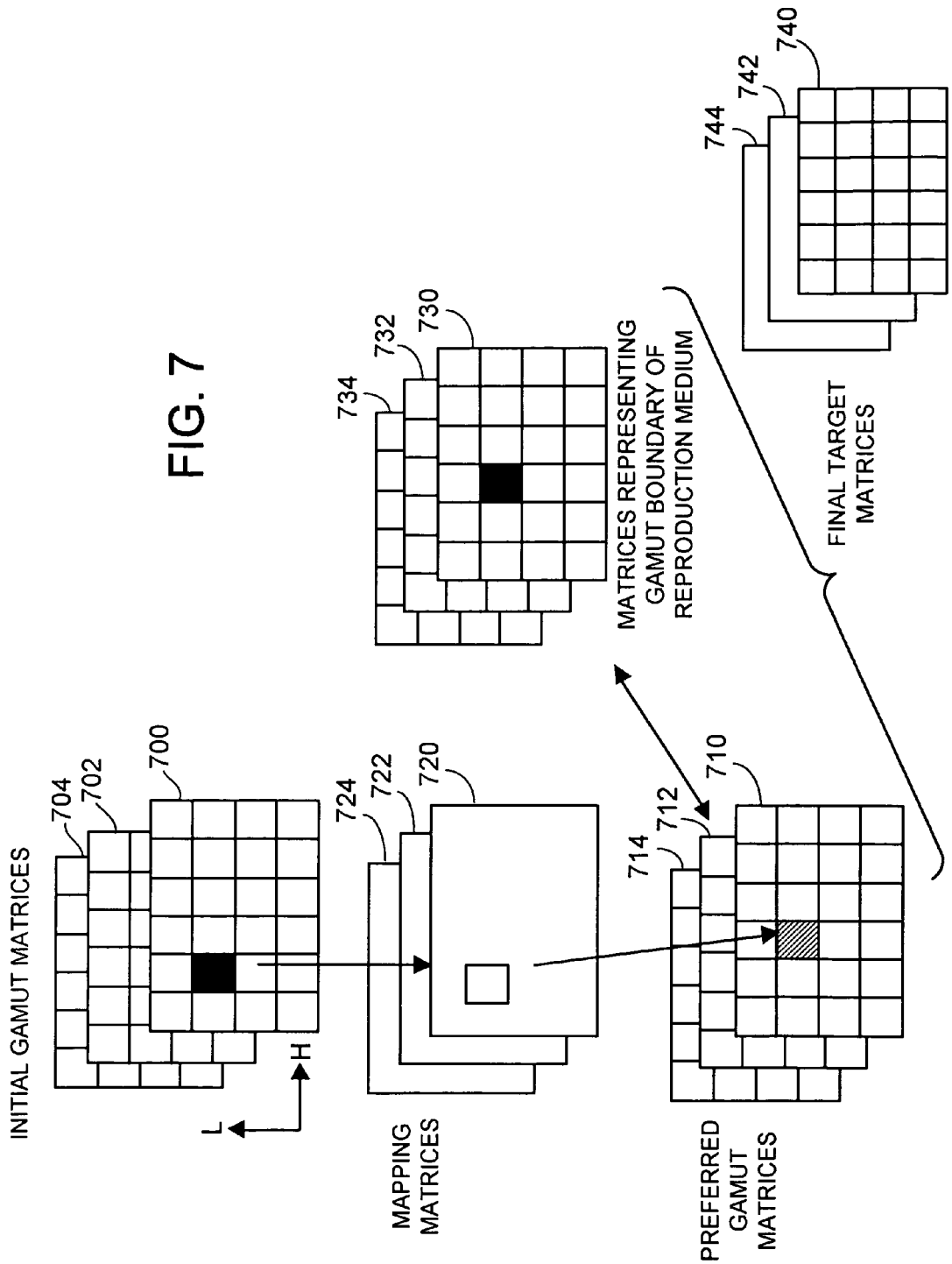

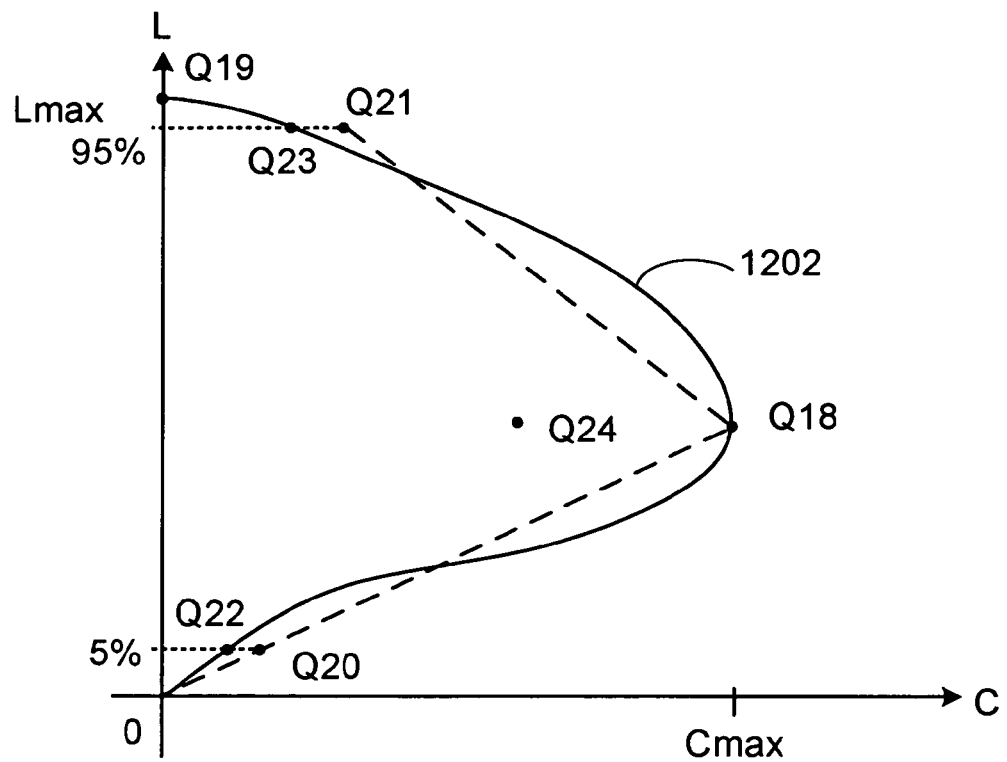
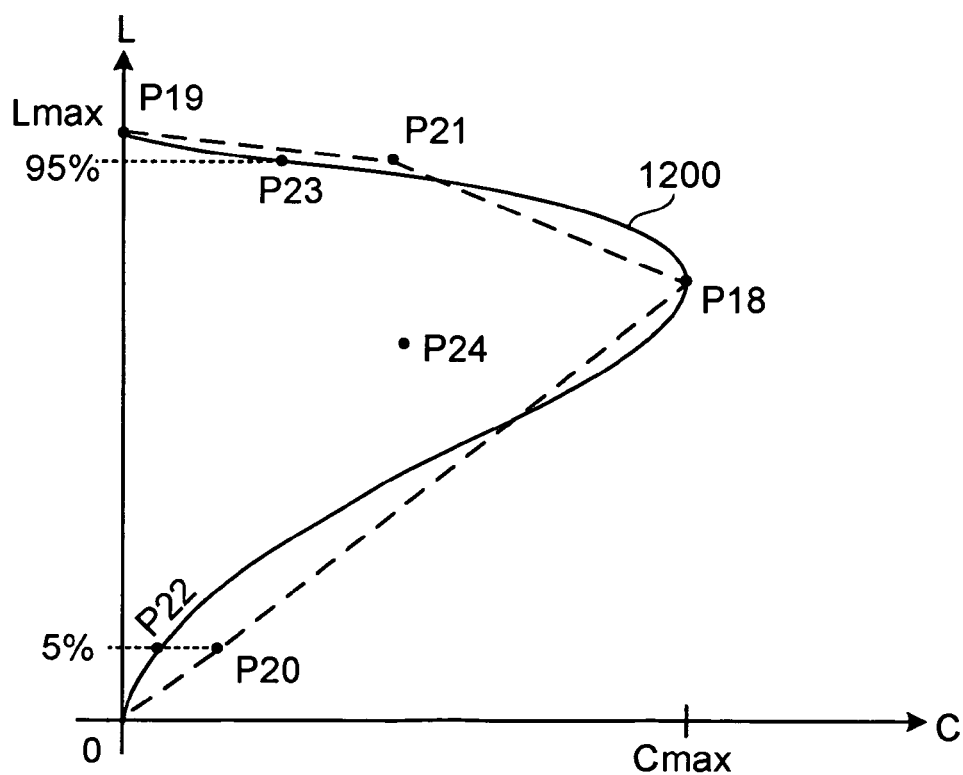
FIG. 12

COLOR GAMUT MAPPING

BACKGROUND

This description relates to color gamut mapping.

Color gamut refers to the range of colors that can be reproduced by a medium or processed by a device. Color gamut mapping is useful in processing color data of images that are reproduced in different media or processed by different devices. The color gamut of an image can be compressed or expanded. For example, an image recorded on a color slide film may have colors outside the range of colors that can be shown on a liquid crystal display. To show such an image on the display, some of the colors will have to be clipped or compressed. On the other hand, the color gamut of a dull photo can be expanded to have brighter and more vivid colors.

In one example, a color gamut can be represented as a volume in a color space that uses a cylindrical coordinate system. Each point in the volume represents a color, and the coordinates (height, radius, and azimuthal angle) of the point represent the luminance (L), chroma (C), and hue (H), respectively, of the color. The surface of the volume represents the color gamut boundary, indicating the outer range of the color gamut.

The color gamut of a first medium or device can be represented as a first volume in the color space. The color gamut of a second medium or device can be represented as a second volume in the color space. Color gamut mapping involves mapping (or converting) coordinates of points in the first volume to coordinates of points in the second volume. The human eye is typically more sensitive to changes in hue. One method of gamut mapping is performed by preserving perceived or actual hue values while changing the luminance and/or chroma values.

SUMMARY

In general, in one aspect, the invention features a method that includes mapping a first data point in a color space to a second data point in the color space, based on a first relationship among a first set of regions defined by the first data point and a first set of reference points, and a second relationship among a second set of regions defined by the second data point and a second set of reference points.

Implementations of the invention may include one or more of the following features. The regions include two-dimensional regions. The regions include three-dimensional regions. Each of the first set of regions has a vertex that coincide with the first data point, and each of the second set of regions has a vertex that coincide with the second data point. The first relationship includes ratios between regions in the first set of regions. The second relationship includes ratios between regions in the second set of regions. At least one of the first set of reference points coincide with one of the second set of reference points. Each one of the first set of regions corresponds to one of the second set of regions. The ratio of each pair of regions in the first set of regions is substantially equal to the ratio of a corresponding pair of regions in the second set of regions. At least one of the first set of reference points is on a boundary of a first color gamut. One of the first set of reference points represents one of a maximum luminance, a minimum luminance, and a maximum chroma of the first color gamut. At least one of the second set of reference points is positioned on a boundary of a second color gamut. One of the second set of reference points represents one of a maximum luminance, a minimum luminance, and a maximum chroma of the second color gamut. The color space uses one of a red-green-blue (RGB) coordinate system, a cyan-magenta-yellow (CMY) coordinate system, a CIELAB coordinate system, and a luminance-chroma-hue (LCH) coordinate system. The method also includes processing the second data point using one of a display or a printer to reproduce a color associated with the second data point.

In general, in another aspect, the invention features a method that includes converting coordinates of initial points in a first color gamut to coordinates of target points in a second color gamut, including, for each initial point, determining a corresponding target point based on ratios of regions defined by the initial point and a subset of reference points of the first color gamut, and ratios of regions defined by the target data point and a subset of reference points of the second color gamut.

Implementations of the invention may include one or more of the following features. The regions include two-dimensional regions. The regions include three-dimensional regions. Each reference point in the first color gamut corresponds to a reference point in the second color gamut, and the target point is selected so that ratios of regions defined by the initial point and the subset of reference points of the first color gamut are substantially equal to ratios of corresponding regions defined by the target data point and the corresponding subset of reference points of the second color gamut. Determining a mapping from a first initial point to a first target point is based on ratios of regions defined by the first initial point and a first subset set of reference points in the first color gamut, and determining a mapping from a second initial point to a second target point is based on ratios of regions defined by the second initial point and a second subset of reference points in the first color gamut, in which the first subset of reference points do not entirely coincide with the second subset of reference points. The reference points in the first color space define multiple regions in the first color space, and initial points in different regions are mapped to target points based on different subsets of reference points. The reference points include points on a boundary of the first color gamut and at least one point within the boundary of the first color gamut. There are more than one reference point within the boundary of the first color gamut, and the reference points within the first color gamut are selected to achieve a specified color transition effect.

In general, in another aspect, the invention features a method that includes mapping initial data points in an initial color gamut to corresponding target data points in a target color gamut, including using at least one control point in the initial color gamut to define different regions in the initial color gamut and at least one corresponding control point in the target color gamut to define different regions in the target color gamut, so that initial data points in the different regions of the initial color gamut are mapped to corresponding target data points in different regions of the target color gamut using different types of mapping.

Implementations of the invention may include one or more of the following features. The mapping of initial data points to target data points is based on relationships among regions defined by the initial data points and reference points of the initial color gamut, and relationships among regions defined by the target data points and reference points of the target color gamut. The control points and reference points are selected so that initial data points in a first region in the initial color gamut are mapped to corresponding target points having identical coordinates, while data points in a second region in the initial color gamut are mapped to corresponding target point having different coordinates. The different regions in the initial color gamut are defined by the at least one control point and at least one reference point on a boundary of the initial color gamut. The different regions in the target color gamut are defined by the at least one control point and at least one reference point on a boundary of the target color gamut. The regions include two-dimensional regions. The regions include three-dimensional regions.

In general, in another aspect, the invention features a method that includes converting coordinates of source reference points in a color space to coordinates of destination reference points in the color space; and converting coordinates of an initial point to coordinates of a target point based on a first relationship among a first set of volumes and a second relationship among a second set of volumes, the first set of volumes being defined at least in part by the initial point and at least a subset of the source reference points, the second set of volumes being defined at least in part by the target point and at least a subset of the destination reference points.

Implementations of the invention may include one or more of the following features. The first set of volumes are associated with polyhedrons that have a common vertex at the initial point. The source reference points include three reference points, and at least one of the polyhedrons associated with the first set of volumes includes a tetrahedron having vertices that coincide with the initial point and a source reference point. The first relationship represents volume ratios of the polyhedrons that have a common vertex at the initial point. The second set of volumes are associated with polyhedrons that have a common vertex at the target point. The second relationship represents volume ratios of the polyhedrons that have a common vertex at the target point. The volume ratios of the polyhedrons that have a common vertex at the initial point are substantially equal to volume ratios of the polyhedrons that have a common vertex at the target point. The initial point belongs to a source color gamut, and the target point belongs to a destination color gamut. The first color gamut represents a range of luminance, chroma, and hue of an image source. The second color gamut represents a range of luminance, chroma, and hue that can be reproduced by one of a display and a printer. The source reference points are positioned on a boundary of a source color gamut. The destination reference points are positioned on a boundary of a destination color gamut. The coordinates of the source reference points are converted to the coordinates of the destination reference points based on a predetermined mapping between a boundary of the source color gamut and a boundary of the destination color gamut. The source color gamut substantially overlaps the destination color gamut. The method includes providing a first matrix to represent data points on a boundary of a source color gamut. The method includes providing a second matrix to represent data points on a boundary of a destination color gamut. The method includes providing a third matrix to store mapping information about mapping of data points represented by the first matrix to data points represented by the second matrix. The source reference points belong to a subset of data points represented by the first matrix, the destination reference points belong to a subset of data points represented by the second matrix, and the coordinates of the initial point are converted to coordinates of the target point based on the mapping information stored in the third matrix. The first matrix includes a two-dimensional array of chroma values, in which rows and columns of the matrix represent luminance and hue values. At least one of the source reference points coincide with one of the destination reference points. The source reference points include surface reference points and internal reference points, the surface reference points coinciding with vertices of a convex hull of all of the source reference points, the internal reference points being within the convex hull and dividing the convex hull into a first set of polyhedrons each having a vertex that coincides with at least one internal reference point. The first set of volumes are associated with a second set of polyhedrons having a common vertex at the initial point, the second set of polyhedrons being enclosed by the one of the first set of polyhedrons. The color space uses one of a red-green-blue (RGB) coordinate system, a cyan-magenta-yellow (CMY) coordinate system, a CIELAB coordinate system, and a luminance-chroma-hue (LCH) coordinate system.

In general, in another aspect, the invention features a method that includes providing a first two-dimensional array of values to represent a first set of points on a boundary of a first color gamut in a three dimensional color space, each color in the first color gamut being represented by three coordinates of the color space, the indices of the two dimensions of the array representing coordinates of a first dimension and a second dimension in the color space, and the values of the array representing coordinates of a third dimension in the color space.

Implementations of the invention may include one or more of the following features. The method includes providing a second two-dimensional array of values to represent a second set of points on a boundary of a second color gamut. The method includes providing a third two-dimensional array to store information about converting values in the first array to values in the second array. The color space uses one of a red-green-blue (RGB) coordinate system, a cyan-magenta-yellow (CMY) coordinate system, a CIELAB coordinate system, and a luminance-chroma-hue (LCH) coordinate system.

In general, in another aspect, the invention features a method that includes receiving information about a boundary of a first color gamut in a three dimensional color space; receiving information about a boundary of a second color gamut in the color space; and deriving a two-dimensional representation of a mapping of data points on the boundary of the first color gamut to data points on the boundary of the second color gamut.

Implementations of the invention may include one or more of the following features. The method includes comprising receiving data representing color coordinates of pixels of an image. The method includes converting the color coordinates of the pixels to destination color coordinates based on the two-dimensional representation. The two-dimensional representation includes a two-dimensional array storing information about a relationship between chroma values of colors in the first color gamut and chroma values of colors in the second color gamut. The two-dimensional representation includes a two-dimensional array storing information about a relationship between luminance values of colors in the first color gamut and luminance values of colors in the second color gamut. The two-dimensional representation includes a two-dimensional array storing information about a relationship between hue values of colors in the first color gamut and hue values of colors in the second color gamut.

In general, in another aspect, the invention features a method that includes receiving a source image; determining color coordinates of pixels of the image, the color coordinates representing colors of the pixels in a three-dimensional color space; and converting the color coordinates of the pixels to destination color coordinates using a two-dimensional representation of a mapping of data points on a boundary of a source color gamut to data points on a boundary of a destination color gamut, the colors of the source image being within the source color gamut, and the destination color coordinates representing colors within the destination color gamut.

Implementations of the invention may include one or more of the following features. The destination color gamut includes a color gamut of one of a display and a printer. The two-dimensional representation is used to find destination reference points on the boundary of the destination color gamut that corresponds to source reference points on the boundary of the source color gamut. Converting the color coordinates of the pixels to destination color coordinates includes, for each pixel, finding a first relationship among a first set of polyhedrons defined at least in part by the color coordinates of the pixel and at least a subset of the source reference points, and finding a second relationship among a second set of polyhedrons defined at least in part by the destination color coordinates and at least a subset of the destination reference points. The first relationship includes volume ratios of the first set of polyhedrons, and the second relationship includes volume ratios of the second set of polyhedrons.

In general, in another aspect, the invention features an apparatus that includes a memory to store a first two-dimensional array of values that represent a first set of points on a boundary of a first color gamut in a three dimensional color space, each color in the first color gamut being represented by three coordinates of the color space, the indices of the two dimensions of the array representing coordinates of a first dimension and a second dimension in the color space, and the values of the array representing coordinates of a third dimension in the color space.

Implementations of the invention may include one or more of the following features. The memory further stores a second two-dimensional array of values that represent a second set of points on a boundary of a second color gamut. The memory further stores a third two-dimensional array having information about conversion of coordinates from values in the first array to values in the second array. The apparatus includes a data processor to process coordinates of colors of an image using at least one of the first, second, and third two-dimensional array of values. The apparatus includes one of a display and a printer to output the image that is processed using at least one of the first, second, and third two-dimensional array of values. The color space uses one of a red-green-blue (RGB) coordinate system, a cyan-magenta-yellow (CMY) coordinate system, a CIELAB coordinate system, and a luminance-chroma-hue (LCH) coordinate system.

In general, in another aspect, the invention features an apparatus that includes a graphic user interface to show an initial color gamut and to allow a user to define multiple regions in the initial color gamut so that initial points in different regions of the initial color gamut are mapped to target points in a target gamut using different types of mapping.

Implementations of the invention may include one or more of the following features. The graphic user interface also shows a target color gamut, the graphic user interface allowing the user to define multiple regions in the target color gamut each corresponding to a region in the initial color gamut. The graphic user interface allows the user to set control points in the initial color gamut to define the multiple regions.

In general, in another aspect, the invention features an apparatus that includes a graphic user interface to show a two-dimensional representation of an initial color gamut over a range of hue values and a two-dimensional representation of a target color gamut over a range of hue values, the graphic user interface having an interactive item to allow a user to designate a type of mapping from data points in the initial color gamut to target points in the target color gamut.

Implementations of the invention may include one or more of the following features. The graphic user interface allows the user to designate a mapping between a range of initial hue values in the initial color gamut to a range of target hue values in the target color gamut.

In general, in another aspect, the invention features a machine-accessible medium, which when accessed results in a machine performing operations including mapping a first point in a color space to a second data point in the color space, taking into account a first relationship among a first set of areas defined by the first data point and a first set of reference points, and a second relationship among a second set of areas defined by the second data point and a second set of reference points.

In general, in another aspect, the invention features a machine-accessible medium, which when accessed results in a machine performing operations including converting coordinates of initial points in a first color gamut to coordinates of target points in a second color gamut, including, for each initial point, determining a corresponding target point based on ratios of areas defined by the initial point and a subset of reference points of the first color gamut, and ratios of areas defined by the target data point and a subset of reference points of the second color gamut.

In general, in another aspect, the invention features a machine-accessible medium, which when accessed results in a machine performing operations including mapping initial data points in an initial color gamut to corresponding target data points in a target color gamut, including using at least one control point in the initial color gamut to define different regions in the initial color gamut and at least one corresponding control point in the target color gamut to define different regions in the target color gamut, so that initial data points in the different regions of the initial color gamut are mapped to corresponding target data points in different regions of the target color gamut using different types of mapping.

In general, in another aspect, the invention features a machine-accessible medium, which when accessed results in a machine performing operations including converting coordinates of source reference points in a color space to coordinates of destination reference points in the color space; and converting coordinates of an initial point to coordinates of a target point based on a first relationship among a first set of volumes and a second relationship among a second set of volumes, the first set of volumes being defined at least in part by the initial point and at least a subset of the source reference points, the second set of volumes being defined at least in part by the target point and at least a subset of the destination reference points.

In general, in another aspect, the invention features a machine-accessible medium, which when accessed results in a machine performing operations including providing a first two-dimensional array of values to represent a first set of points on a boundary of a first color gamut in a three dimensional color space, each color in the first color gamut being represented by three coordinates of the color space, the indices of the two dimensions of the array representing coordinates of a first dimension and a second dimension in the color space, and the values of the array representing coordinates of a third dimension in the color space.

In general, in another aspect, the invention features a machine-accessible medium, which when accessed results in a machine performing operations including receiving information about a boundary of a first color gamut in a three dimensional color space; receiving information about a boundary of a second color gamut in the color space; and deriving a two-dimensional representation of a mapping of data points on the boundary of the first color gamut to data points on the boundary of the second color gamut.

In general, in another aspect, the invention features a machine-accessible medium, which when accessed results in a machine performing operations including receiving a source image; determining color coordinates of pixels of the image, the color coordinates representing colors of the pixels in a three-dimensional color space; and converting the color coordinates of the pixels to destination color coordinates using a two-dimensional representation of a mapping of data points on a boundary of a source color gamut to data points on a boundary of a destination color gamut, the colors of the source image being within the source color gamut, and the destination color coordinates representing colors within the destination color gamut.

Other features and advantages of the invention will be apparent from the description and drawings, and from the claims.

DESCRIPTION

FIGS. 1 and 2 show mappings of points in a color space.
FIGS. 3 and 4 show scatter plots.
FIG. 5 shows matrices used for mapping of color coordinates.
FIGS. 6A to 6D show mapping of color gamut boundaries.
FIG. 7 shows matrices for mapping of color coordinates.
FIGS. 8, 9A to 9C, and 10A to 10C, 11, 12, and 13 show mappings of points in color spaces.
FIG. 14 shows a process for mapping an initial point to a target point in a color space.
FIG. 15 shows a graphic user interface.

Mapping of color gamut in a three-dimensional color space can be achieved by mapping surface points on an initial color gamut boundary to surface points on a target color gamut boundary, and mapping internal points of the initial color gamut to internal points of the target color gamut based on the mapped surface points. The mapping of surface points on the color gamut boundary is selected to achieve certain color transformation effects, such as shifting, replacing, compressing, expanding, emphasizing, or de-emphasizing certain colors.

In one example, to map an internal point of an initial color gamut to an internal point of a target color gamut, three surface points are selected so that the internal point is enclosed by a tetrahedron having its four vertices at the three surface points and the origin. The internal point is then mapped in a way to preserve the volume ratios of four smaller tetrahedrons defined by the internal point, the three surface points, and the origin of the coordinate system of the color space, so that the four smaller polyhedrons have a common vertex at the internal point.

In one example, an initial color gamut boundary can be represented by three matrices, each storing chroma, luminance, and hue values, respectively, of sample points on the initial color gamut boundary. The three matrices are collectively referred to as initial gamut matrices. Similarly, a target color gamut boundary can be represented by three matrices, each storing chroma, luminance, and hue values, respectively, of sample points on the target color gamut boundary. The three matrices are collectively referred to as the target gamut matrices. Because the initial and target gamut matrices describe gamut boundaries, the initial and target gamut matrices are referred to as gamut boundary descriptors.

Information about how chroma, luminance, and hue values are converted from those in the initial gamut matrices to those in the target gamut matrices can be stored in three matrices, collectively referred to as mapping matrices. By adjusting the values in the mapping matrices, various color transformation effects can be achieved.

An advantage of the mapping process described above is that various color transformation effects can be easily achieved by varying the mapping schemes for the surface points, which can be achieved by varying the mapping matrices. The mapping of surface points is fast, as it involves transformation of coordinates in a two-dimensional space (as compared to processing data points in a three-dimensional space). Once the mapping of surface points is determined, efficient algorithms can be used to map the internal points.

A feature of the mapping process described above is that matrices are used to store information about the initial and target color gamut boundaries and the mapping between the two boundaries. The two-dimensional matrices provide intuitive representations of the overall initial and target color gamuts, allowing a user to easily visualize the type of mapping that is needed to achieve a certain color transformation effect. Storing information about the mapping of luminance, chroma, and hue values in three different matrices allows the user to easily individually adjust the mapping of luminance, chroma, and hue values.

Referring to FIG. 1, in one example, surface points on an initial (or source) color gamut boundary 100 of an initial color gamut 102 are mapped to surface points on a target (or destination) color gamut boundary 104 of a target (or destination) color gamut 106. This figure shows nine surface points on each of the initial and target color gamut boundaries. In this example, a surface point Pi is mapped to a surface point Qi, for i=2 to 10.

To map an internal point P1 (a point that is inside the volume bound by the color gamut boundary) of the initial color gamut 102 to an internal point Q1 of the target color gamut 106, three surface points on the initial color gamut boundary 100 are selected such that P1 is enclosed by the tetrahedron formed by the origin O and the three selected points.

In this example, P1 is enclosed by the tetrahedron 108 having O, P2, P3, and P5 as vertices. The three points, P2, P3, and P5, on the initial color gamut boundary 100 are mapped to corresponding points on the target color gamut boundary 104. Here, the corresponding points are Q2, Q3, and Q5. The origin O and the three points Q2, Q3, and Q5 define a tetrahedron 110, in which the tetrahedron 110 has vertices at points O, Q2, Q3, and Q5.

Referring to FIG. 2, the points O, P1, P2, P3, and P5 define four smaller tetrahedrons within the tetrahedron 108, in which the four smaller tetrahedrons have a common vertex at P1. The first tetrahedron has vertices at points P1, O, P2, and P3. The second tetrahedron has vertices at points P1, O, P2, and P5. The third tetrahedron has vertices at points P1, O, P3, and P5. The fourth tetrahedron has vertices at points P1, P2, P3, and P5. The volumes of the first, second, third, and fourth tetrahedrons are VP1, VP2, VP3, and VP4, respectively.

For a given internal point Q1 of the tetrahedron 110, the points O, Q1, Q2, Q3, and Q5 define four smaller tetrahedrons within the tetrahedron 110, in which the four smaller tetrahedrons have a common vertex at Q1. The first tetrahedron has vertices at points Q1, O, Q2, and Q3. The second tetrahedron has vertices at points Q1, O, Q2, and Q5. The third tetrahedron has vertices at points Q1, O, Q3, and Q5. The fourth tetrahedron has vertices at points Q1, Q2, Q3, and Q5. The volumes of the first, second, third, and fourth tetrahedrons are VQ1, VQ2, VQ3, and VQ4, respectively.

The target point Q1 is selected so that volume ratios satisfy the following relationship:

VQ1:VQ2:VQ3:VQ4=VP1:VP2:VP3:VP4    Equ. 1

The algorithm for finding volumes VP1, VP2, VP3, VP4, VQ1, VQ2, VQ3, VQ4, and coordinates of Q1 is based on Delaunay triangulation of the data points, described in "Scattered data interpolation methods for electronic imaging systems: a survey" by Isaac Amidror, Journal of Electronic Imaging, Vol. 11 (2), pp. 157-176, Apr. 2002, and "The Quickhull Algorithm for Convex Hulls" by C. Bradford Barber, David P. Dobkin, and Hannu Huhdanpaa, ACM Transactions on Mathematical Software, Vol. 22, No. 4, pp. 469-483, Dec. 1996.

In one example, the initial color gamut 102 represents the range of colors that can be reproduced by a source medium (e.g., a color slide film), and the target color gamut 106 represents the range of colors that can be reproduced by a target medium (e.g., a liquid crystal display). The mapping from P1 to Q1 represents color compression, as the luminance and/or the chroma values are reduced. A similar method can be used to map Q1 to P1, which represents color example, in which the luminance and/or chroma values are increased.

FIG. 14 shows an example of a process 1400 for mapping an initial point P1 to a target point Q1. Coordinates of sample points on a boundary of an initial color gamut are received 1402. Coordinates of sample points on a boundary of a target color gamut are received 1404. The coordinates of an initial point in the initial color gamut is received 1406.

Three source reference points on the initial color gamut boundary are selected so that the initial point is enclosed by a tetrahedron having vertices at the origin and the three source reference points. The initial point, the origin, and the three source reference points define four smaller tetrahedrons. The volumes VP1, VP2, VP3, an VP4 of the four smaller tetrahedrons are calculated 1410.

The three reference points on the initial color gamut boundary are mapped 1412 to three target reference points on the target color gamut boundary. A target point Q is determined 1414 using an algorithm based on the Delaunay triangulation so that volume ratios satisfy the relationship

VP1:VP2:VP3:VP4=VQ1:VQ2:VQ3:VQ4, where VQ1, VQ2, VQ3, and VQ4 are the volumes of the smaller tetrahedrons defined by the origin, the target point Q, and the three target reference points. By preserving the volume ratios, initial points that are close to one another will be mapped to target points that are also close to one another.

An advantage of converting the colors of an image from one color gamut to another using the surface point mapping and internal point mapping described above is that luminance, chroma, and hue values can be simultaneously adjusted, so the resulting image will have smoother transitions between different colors and be more pleasing to a majority of viewers. In a prior art method, in which color gamut mapping is performed by converting luminance and chroma values while holding the hue value constant, there may be large differences between luminance and chroma values of colors having similar but slightly different hue values. This is because, in the prior art method, mapping of the luminance and chroma values for a particular hue value is performed without considering the luminance and chroma values of colors having slightly different hue values. By using the surface point mapping described above, luminance and chroma values of colors having similar hue values will also be mapped to similar luminance and chroma values, resulting in an overall smoother transition of colors. The resulting image will be more pleasing to a majority of viewers.

FIG. 3 shows a three-dimensional scatter plot 300 having data points that represent sample points on a color gamut boundary 306. Unlike FIG. 1, which shows color gamuts 102 and 106 in a color space that uses a cylindrical coordinate system, FIG. 3 shows the color gamut 306 in a color space that uses a rectangular coordinate system having three orthogonal axes, in which the coordinates on each axis correspond to luminance, chroma, and hue values, respectively.

In the example of FIG. 3, the luminance values (L) range from 0 to 100, the chroma values (C) range from 0 to 100, and the hue values (h) range from 0 to 1. The higher the luminance value, the lighter the color (as opposed to darker). The higher the chroma value, the purer the color. The hue values of red, yellow, green, cyan, blue, and magenta are approximately 0, 0.17, 0.33, 0.5, 0.67, and 0.83, respectively.

Referring again to FIG. 1, in one example, a mapping of sample points on the initial color gamut boundary 100 to sample points on the target color gamut boundary 104 is achieved by converting coordinates of data points in one three-dimensional scatter plot to the coordinates of corresponding data points in another three-dimensional scatter plot.

Because of the maturity of algorithms and software that have been developed for processing matrices (which are two-dimensional arrays), it is easier to process the mapping of data points in a three-dimensional color space using matrices. Data represented as matrices can often be process faster than other formats of data structures.

One way of processing coordinates of data points in three-dimensional space is to project the data points onto a two-dimensional space, and process the two-dimensional coordinates of the data points. For example, FIG. 4 shows a two-dimensional scatter plot 400 that is obtained by projecting each data point in the three-dimensional scatter plot 300 onto a plane that is perpendicular to the chroma axis 302. The two-dimensional scatter plot 400 represents what a viewer would see if the three-dimensional scatter plot 300 were viewed along a direction 304 that is parallel to the chroma axis 302. The coordinates of each data point in the two-dimensional scatter plot 400 represent luminance and hue values of the color represented by the data point.

Referring to FIG. 5, in one example, the chroma, luminance, and hue values of the sample points on the color gamut boundary 306 (represented by the data points in the three-dimensional scatter plot 300), are stored in three matrices 500, 502, and 504, respectively, each including rows and columns of cells. A cell at row x and column y of the matrix 500, 502, or 504 will be referred to as cell C(x, y), L(x, y), or H(x, y), respectively. In one example, there are 10,000 data points in each of the three-dimensional scatter plot 300 and the two-dimensional scatter plot 400.

In one example, each data point is associated with a cell having indices that are approximately proportional to the luminance and hue values of the data point. For example, assume that the color gamut boundary 100 is sampled on a 1,000-by-1,000 grid. The resolution for hue and luminance values are $1/1000=0.001$ and $100/1000=0.1$, respectively. The L-H plane in scatter plot 400 is divided by a 1,000-by-1,000 grid, and each of the 10,000 data points falls within one of the 1,000×1,000 squares defined by the grid. Each of the matrices 500, 502, and 504 has 1,000 rows by 1,000 columns of cells, each cell corresponding to one of the squares. Each cell in the matrices 500, 502, and 504 stores the chroma, luminance, and hue values, respectively, of a data point, if any, that falls within the square.

For example, a point P11 in plots 300 and 400 has chroma, luminance, and hue values C=3.58, L=5.05, and H=0.0257, which are stored in the matrices 500, 502, and 504 as C(51, 26)=3.58, L(51, 26)=5.05, and H(51, 26)=0.0257. A point P12 has chroma, luminance, and hue values C=26, L=82.75, and H=0.3782, which are stored in the matrices 500, 502, and 504 as C(828, 379)=26, L(828, 379)=82.75, and H(828, 379)=0.3782. A point P13 has chroma, luminance, and hue values C=21.6, L=92.85, and H=0.9823, which are stored in the matrices 500, 502, and 504 as C(929, 983)=21.6, L(929, 983)=92.85, H(929, 983)=98.23. Cells that are not associated with any data point can be filled with zero, or filled with interpolated values.

Similar to matrices 500, 502, and 504, three matrices 510, 512, and 514 are configured to include the chroma, luminance, and hue values of sample data points on the target color gamut boundary 104.

Mapping matrices 520, 522, and 524 are configured to include information about how the sample points on the initial color gamut boundary 100 are mapped to the sample points on the target color gamut boundary 104. In one example, the mapping matrices 520, 522, and 524 store the differences between the initial and target chroma, luminance, and hue values.

To avoid confusion, the cells of matrices 500, 502, and 504 will be referred to as $C_{initial}(x, y)$, $L_{initial}(x, y)$, and $H_{initial}(x, y)$, collectively referred to as initial cells $LCH_{initial}(x, y)$. The cells of matrices 510, 512, and 514 will be referred to as $C_{target}(x, y)$, $L_{target}(x, y)$, and $H_{target}(x, y)$, collectively referred to as target cells $LCH_{target}(x, y)$. The cells of matrices 520, 522, and 524 will be referred to as $C_{mapping}(x, y)$, $L_{mapping}(x, y)$, and $H_{mapping}(x, y)$, collectively referred to as mapping cells $LCH_{mapping}(x, y)$.

If an initial data point P2 (FIG. 1) that is associated with cells $LCH_{initial}(x_i, y_i)$ is to be mapped to a target data point Q2 that is associated with $LCH_{target}(x_t, y_t)$, then the values ΔC, ΔL, and ΔH stored in cells $LCH_{mapping}(x_i, y_i)$ will be:

$$C_{mapping}(x_i, y_i)=\Delta C=C_{target}(x_t, y_t)-C_{initial}(x_i, y_i);$$

$$L_{mapping}(x_i, y_i)=\Delta L=L_{target}(x_t, y_t)-L_{initial}(x_i, y_i); \text{ and}$$

$$H_{mapping}(x_i, y_i)=\Delta H=H_{target}(x_t, y_t)-H_{initial}(x_i, y_i).$$

For example, in FIG. 5, an initial data point represented by cells $LCH_{initial}(4, 2)$ is to be mapped to a target data point represented by cells $LCH_{target}(4, 4)$. The values ΔC, ΔL, and ΔH stored in cells $LCH_{mapping}(4, 2)$ will be:

$$C_{mapping}(4, 2)=\Delta C=C_{target}(4, 4)-C_{initial}(4, 2);$$

$$L_{mapping}(4, 2)=\Delta L=L_{target}(4, 4)-L_{initial}(4, 2); \text{ and}$$

$$H_{mapping}(4, 2)=\Delta C=H_{target}(4, 4)-H_{initial}(4, 2).$$

Which initial data point maps to which target data point is determined by the user based on the desired color transformation effects. Referring to FIG. 15, a graphic user interface 1500 can be used to provide a visual representation of an initial color gamut 1502 and a target color gamut 1504. The graphic user interface 1500 may include an interactive region 1506 to allow the user to define a particular mapping from the initial color gamut 1502 to the target color gamut 1504. For example, a mapping curve designer 1508 may be provided to allow the user to specify how hue values ($h_i$) in the initial color gamut are mapped to hue values ($h_t$) in the target color gamut by configuring a mapping curve 1510. The graphic user interface 1500 may allow the user to select a region 1512 in the initial color gamut to be mapped to a region 1514 in the target color gamut. The graphic user interface 1500 may have a set of menus that include predefined mapping types, such as shifting hue values, increasing/decreasing luminance values, increasing/decreasing chroma values. The graphic user interface 1500 may allow the user to specify a linear, piece-wise linear, or non-linear mapping function to be applied to the data points in the initial color gamut.

FIG. 6A shows a mapping in which the chroma values are compressed and the hue values are preserved. For example, when a initial data point P14 is mapped to a target data point Q14, the chroma value is reduced while the hue value remains the same.

Figure 6A:
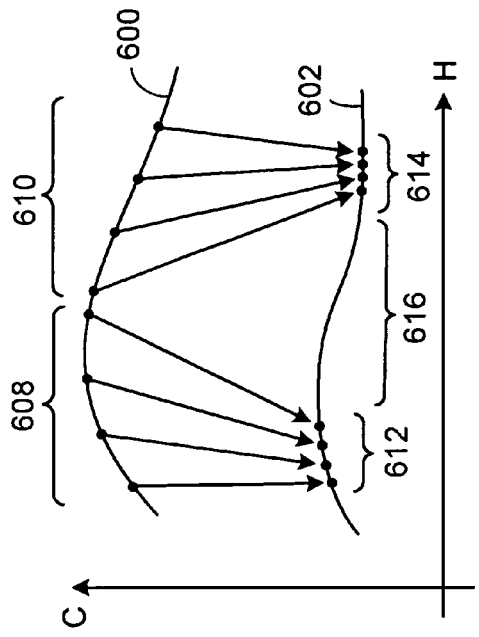
FIGS. 6A to 6D show examples of different mappings of points from an initial color gamut boundary 600 to points on a target color gamut boundary 602, in which chroma and/or hue values are changed. The FIGS. 6A to 6D are shown as two-dimensional graphs, in which changes in luminance are not shown.
Figure 6C:
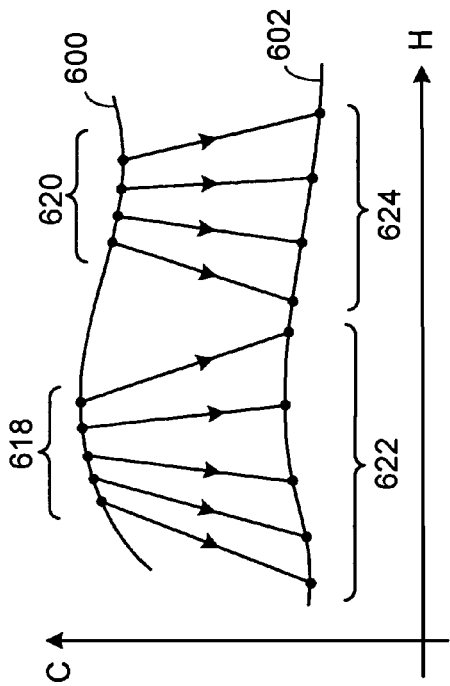
Figure 6B:
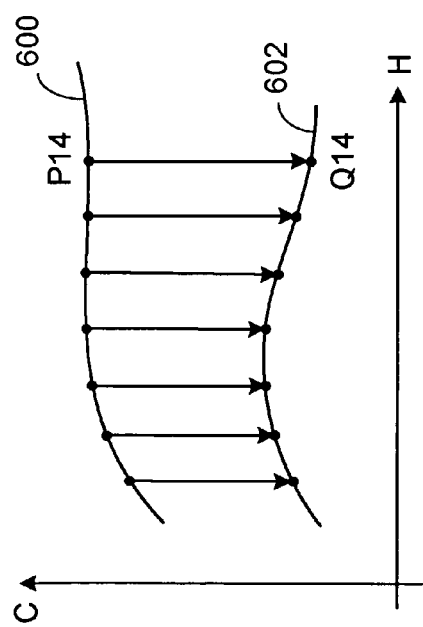

FIG. 6B shows a mapping in which the chroma values are expanded, and a portion of hue values are shifted. Hue values in the range 604 are shifted to hue values in the range 606. Such hue shifting can be used in, for example, shifting reddish color to reddish-orange color.

FIG. 6C shows a mapping in which the chroma values are compressed, and the hue values are concentrated. Hue values in ranges 608 and 610 are concentrated to hue values in ranges 612 and 614, respectively. This results in emphasizing colors having hue values in the ranges 612 and 614, and eliminating colors having hue values in a range 616.

Figure 6D:
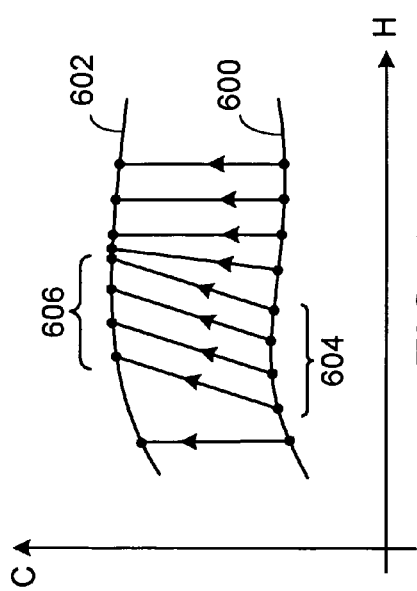

FIG. 6D shows a mapping in which the chroma values are compressed, and the hue values are dispersed. Hue values in ranges 618 and 620 are dispersed throughout ranges 622 and 624, respectively. If an image has a higher concentration of colors having hue values in the ranges 618 and 620, this transformation results in an image having a larger variety of colors, or a larger variety of shades of colors.

The mapping of data points in the initial matrices to the data points in the target matrices can be automatically performed by a computer executing software to implement a color gamut mapping process. The software may receive the initial and target color gamut matrices, and map the data points based on criteria specified by the user.

For example, the user may specify that the mapping preserve luminance and hue values, while clipping or compressing the chroma values. In another example, the chroma and hue values are preserved, while the luminance values are clipped or compressed. In another example, the hue value is preserved, while the luminance and chroma values are both compressed according to a linear or non-linear function. In another example, the user may specify that a particular range of hues be shifted to another range of hues. The user may specify that a particular range of hues be concentrated to a smaller range of hues, or be expanded to a wider range of hues. The user may specify that, for certain hues, the luminance is preserved while the chroma values are compressed, and for certain hues, the chroma is preserved while the luminance values are compressed. The user may specify that all of the hue values be increased or decreased a specified amount, resulting in color rotation (e.g., red→orange→yellow→green→blue→purple→red).

Based on the user-specified criteria, the software instructs the computer to systematically examine each cell in the initial matrices that stores non-zero values, and finds a target cell that has luminance, chroma, and hue values that most closely match the user-specified criteria.

After the mapping from initial cells $LCH_{initial}(x, y)$ to target cells $LCH_{target}(x, y)$ is determined, three lookup matrices $C_{lookup}$, $L_{lookup}$, and $H_{lookup}$ (not shown), can be established to store the end results of the mapping. The chroma, luminance, and hue values of a target point for a particular initial point represented by cell $LCH_{initial}(xi, yi)$ will be stored in $C_{lookup}(xi, yi)$, $L_{lookup}(xi, yi)$, and $H_{lookup}(xi, yi)$. In the example above, $C_{lookup}(4.2)=C_{target}(4, 4)$, $L_{lookup}(4, 2)=L_{target}(4, 4)$, and $H_{lookup}(4, 2)=H_{target}(4, 4)$.

The above describes a process for determining mapping matrices (520, 522, 524) given the initial matrices (500, 502, 504) and the target matrices (510, 512, 514).

The following describes processes for finding a target data point Q2, given the initial data point P2.

Assume that the initial data point P2 is associated with cells $LCH_{initial}(x_i, y_i)$, and that the target data point Q2 is associated with cells $LCH_{target}(x_t, y_t)$. The luminance of the target point is equal to $L_{initial}(x_i, Y_i)+L_{mapping}(x_i, y_i)$. The index $x_t$, which is the row number of the target cells, is proportional to $L_{initial}(x_i, Y_i)+L_{mapping}(x_i, Y_i)$, and thus can be determined accordingly. The hue value of the target point is equal to $H_{initial}(x_i, y_i)+H_{mapping}(x_i, y_i)$. The index $y_t$, which is the column number of the target cells, is proportional to $H_{initial}(x_i, y_i)+H_{mapping}(x_i, y_i)$, and thus can be determined accordingly. After the indices $x_t$ and $y_t$ are determined, the chroma value of the target data point can be determined using $C_{target}(x_t, y_t)=C_{initial}(x_i, y_i)+C_{mapping}(x_i, y_i)$.

If the lookup matrices $C_{lookup}$, $L_{lookup}$, and $H_{lookup}$ are known, then the chroma, luminance, and hue values of a target point can be looked up in cells $C_{lookup}(x_i, y_i)$, $L_{lookup}(X_i, y_i)$, and $H_{lookup}(x_i, y_i)$.

In one example, the initial gamut matrices (500, 502, 504) are associated with sample data points on a initial color gamut boundary of a source medium (e.g., color slide film), and the target matrices (510, 512, 514) are associated with sample data points on a target color gamut boundary of a target medium (e.g., a liquid crystal display). The initial color gamut boundary represents the limits of the colors that can be reproduced by the source medium. The target color gamut boundary represents the limits of the colors that can be reproduced by the target medium.

The following description uses mapping of an image from a color slide film to a liquid crystal display as an example to illustrate the mapping of color gamuts of images that are reproduced on different media. A particular brand and model of color slide film has a particular color gamut, representing the range of colors that can be expressed by the color slide film. When an image is taken using the color slide film, the image may not include all of the colors that the color slide film is capable of showing. Thus, the color gamut of the image will be a subset of the color gamut of the color slide film. When the color gamuts are represented in a color space, the color gamut of the image will occupy a portion of the color gamut of the color slide film. Data points representing colors of the image can be on or internal to the boundary of the color gamut of the color slide film.

A liquid crystal display has a color gamut that represents the range of colors that the liquid crystal display is capable of showing. The color gamut of the liquid crystal display may be different from the color gamut of the color slide film. Thus, the liquid crystal display may not be capable of displaying all of the colors in the image (referred to as a source image) originally shown on the color slide film. The following describes two processes for converting the color gamut of the source image to a color gamut of a target image that can be shown on the liquid crystal display.

Figure 1:
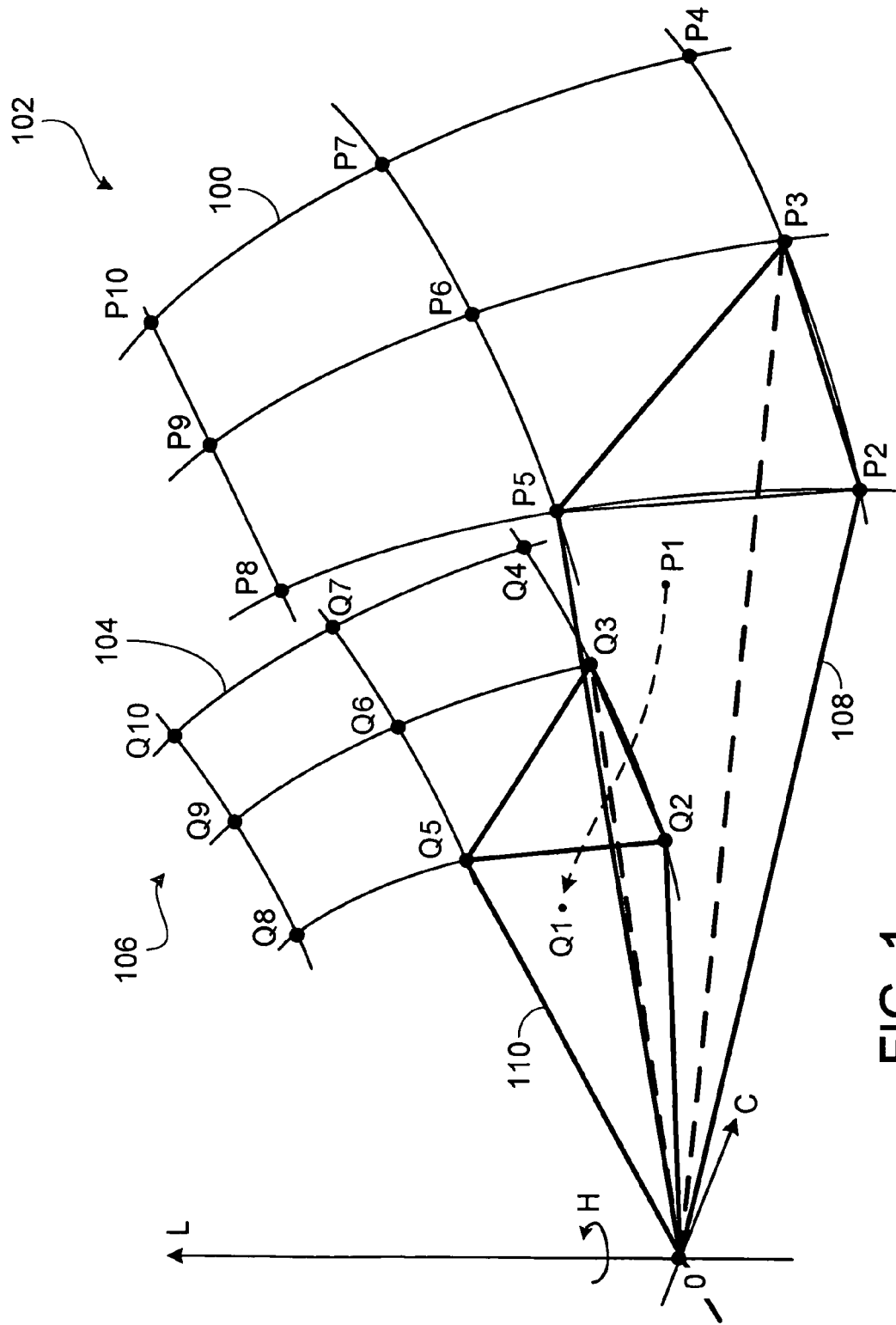
Figure 2:
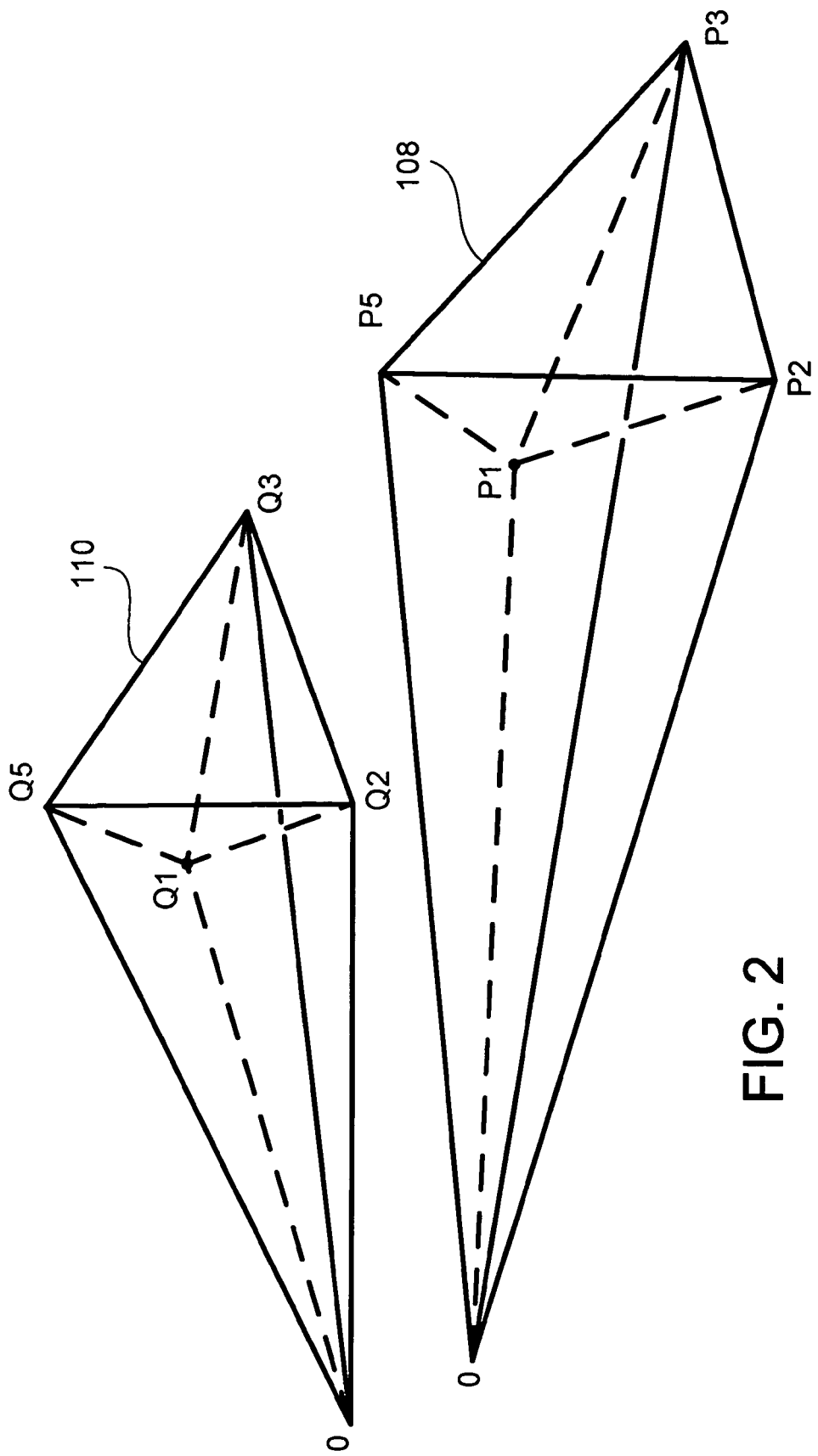
Figure 3:
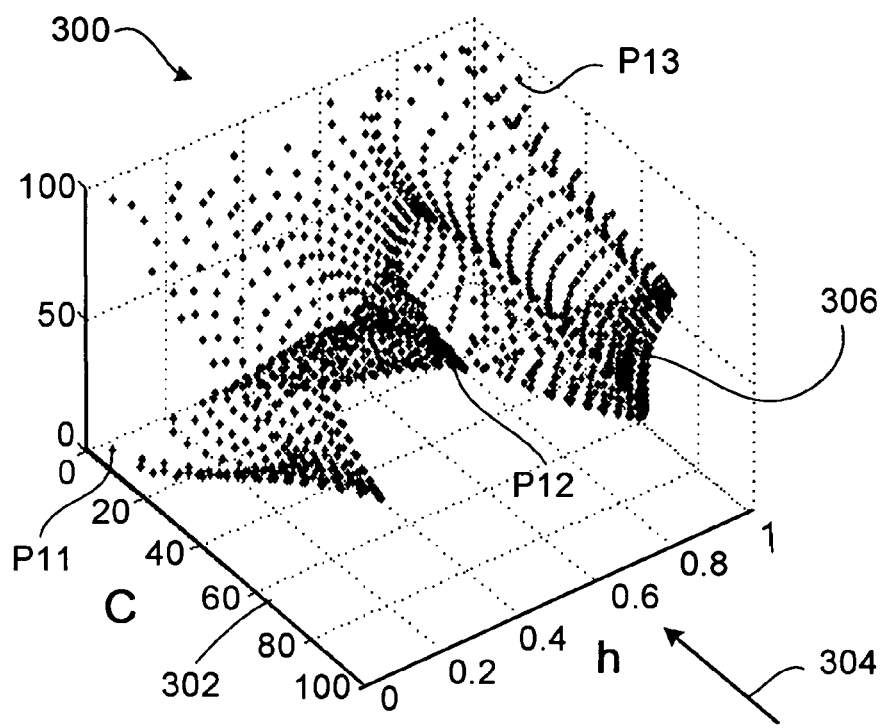
Figure 4:
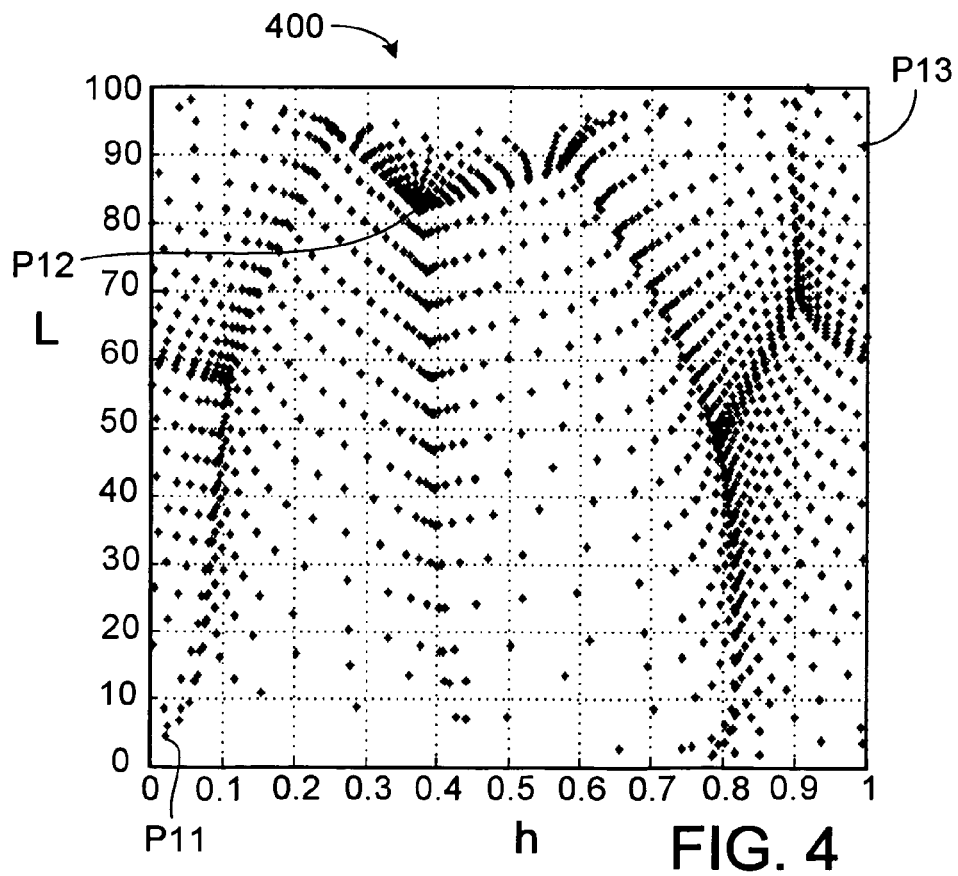

In one example, the mapping of color gamut of the source image is selected so that, if the source image includes all of the colors that can be shown on a color slide film, the target image will include all of the colors that the liquid crystal display is capable of displaying. The color gamut boundary of the color slide film is mapped to the color gamut boundary of the liquid crystal display. In the example of FIG. 1, the color gamut of the color slide film is the initial color gamut 102, and the color gamut of the liquid crystal display is the target color gamut 106.

Information about luminance, chroma, and hue values of sample points of the color gamut boundary of the color slide film can be measured, or obtained from a vendor database. The chroma, luminance, and hue values of the sample points are used to initialize initial matrices 500, 502, and 504. Information about luminance, chroma, and hue values of sample points of the color gamut boundary of the liquid crystal display can be measured, or obtained from a vendor database. The chroma, luminance, and hue values of the sample points are used to initialize target matrices 510, 512, and 514. The mapping matrices 520, 522, 524 are generated by the user using the process described above to achieve a user-defined color transformation effect.

To convert the source image on the color slide film to the target image that can be shown on the liquid crystal display, the source image is scanned by a high quality scanner and analyzed by software to find all the colors that are included in the image. Here, it is assumed that the scanner can faithfully reproduce all the colors shown by the color slide film. Each color in the image is then mapped to a color that can be shown on the liquid crystal display.

Each color of the image corresponds to an initial data point (e.g., P1 of FIG. 1) in the color slide film color gamut, and is mapped to a target data point (e.g., Q1) of the liquid crystal display color gamut using the process 1400 (FIG. 14) described above. Three surface points (e.g., P2, P3, P5) on the initial color gamut boundary (e.g., 100) are determined such that the internal point (e.g., P1) is bound by the tetrahedron (e.g., 108) formed by the origin O, the internal point, and the three selected surface points. The three surface points on the initial color gamut boundary are mapped to three surface points (e.g., Q2, Q3, Q5) on the target color gamut boundary (e.g., 104). A target point (e.g., Q1) that is internal to the target color gamut is determined so that Equ. 1 is satisfied.

Even if the initial data point P1 is on the surface of the tetrahedron formed by O, P2, P3, and P5, or is outside of the tetrahedron, a target data point Q1 can still be determined such that Equ. 1 is satisfied.

The mapping process is repeated for each color in the image. The mapping information can be stored in a look up table, in which each initial color in the image is linked to a target color that falls within the color gamut of the liquid crystal display. After the lookup table is established, the color of each pixel in the scanned image is converted based on the lookup table to generate a target image. The target image will have colors that are fully compatible with the color gamut of the liquid crystal display.

Referring to FIG. 7, in an alternative example, the color gamut boundary of the color slide film (represented by matrices 700, 702, 704) is mapped to a user-preferred color gamut boundary (represented by matrices 710, 712, 714) using user-defined mapping matrices 720, 722, and 724 to achieve a desired color transformation effect, without taking account of the color gamut boundary (represented by matrices 730, 732, 734) of the liquid crystal display.

For example, the user may specify that the hue values of certain colors are shifted by a certain amount without changing the chroma and luminance values. This can be achieved by using mapping matrices 720 and 722 that include all zero values, and a mapping matrix 724 that has non-zero values specifying the amount of hue shift for certain colors. In another example, the user may specify that the luminance and chroma values of certain hues are increased by a certain percentage, while the luminance and chroma values for certain hues are decreased by a certain percentage. This can be achieved by using a mapping matrix 724 (which stores ΔH) that include all zero values, and mapping matrices 720 and 722 (which store ΔC and ΔL) that have positive or negative values for certain hue values specified by the user.

The preferred color gamut boundary is generated without considering the color gamut of the liquid crystal display, so the user-preferred color gamut may not entirely fall within the color gamut of the liquid crystal display. To ensure that all of the colors of the target image can be shown on the liquid crystal display, a final target color gamut boundary is obtained by determining the outer boundary of the intersection of the user-preferred color gamut and the color gamut of the liquid crystal display. The boundary of the intersection is the final target gamut boundary, which is represented by final target matrices 740, 742, and 744.

A smoothing filter (such as a two-dimensional Gaussian function or triangle function) can be applied to the mapping matrices to smooth the transition of colors. In an alternative example, a smoothing filter can be applied to the final target matrices 740, 742, and 744 to smooth the transition of colors.

Figure 14:
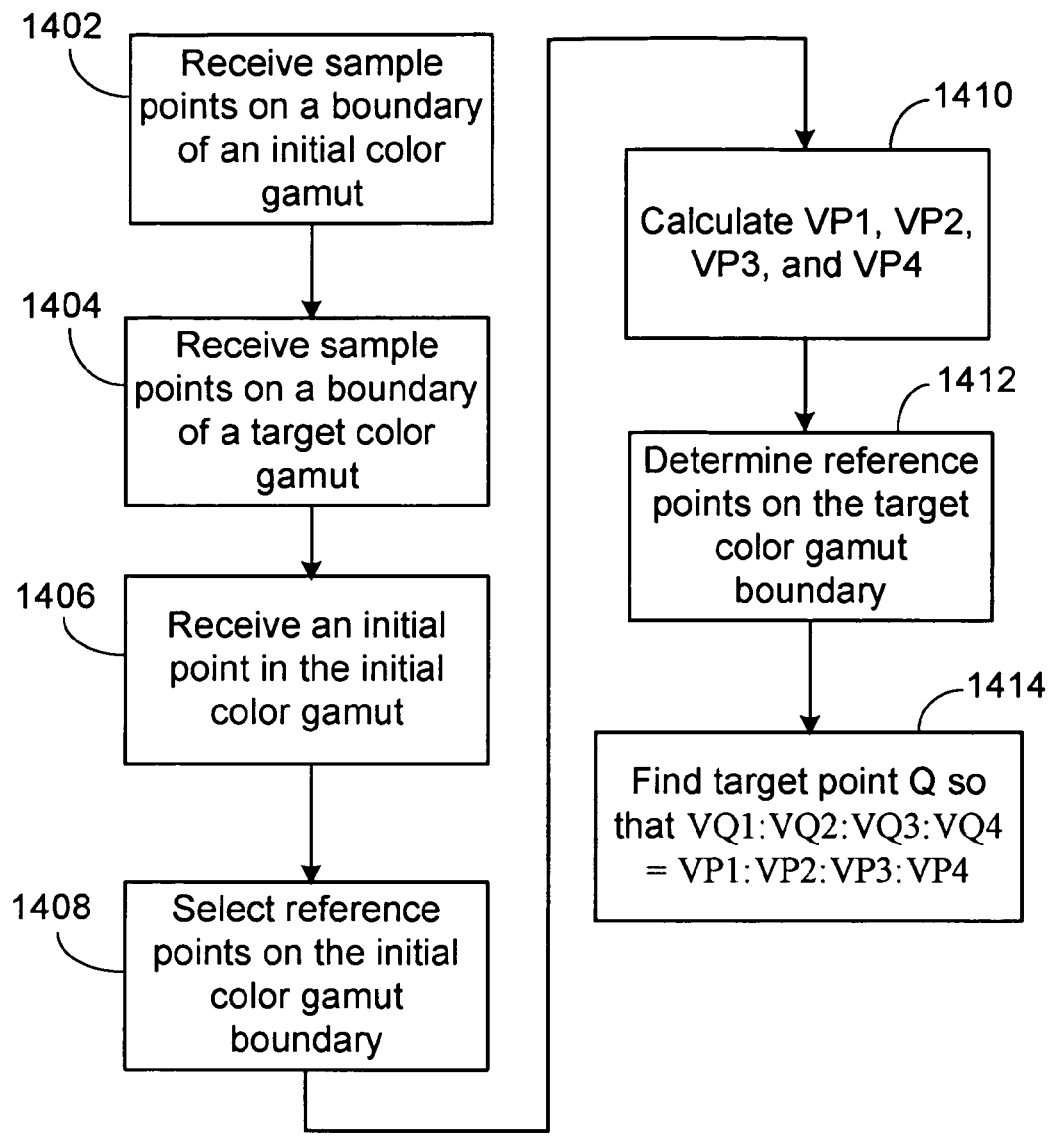
Figure 15:
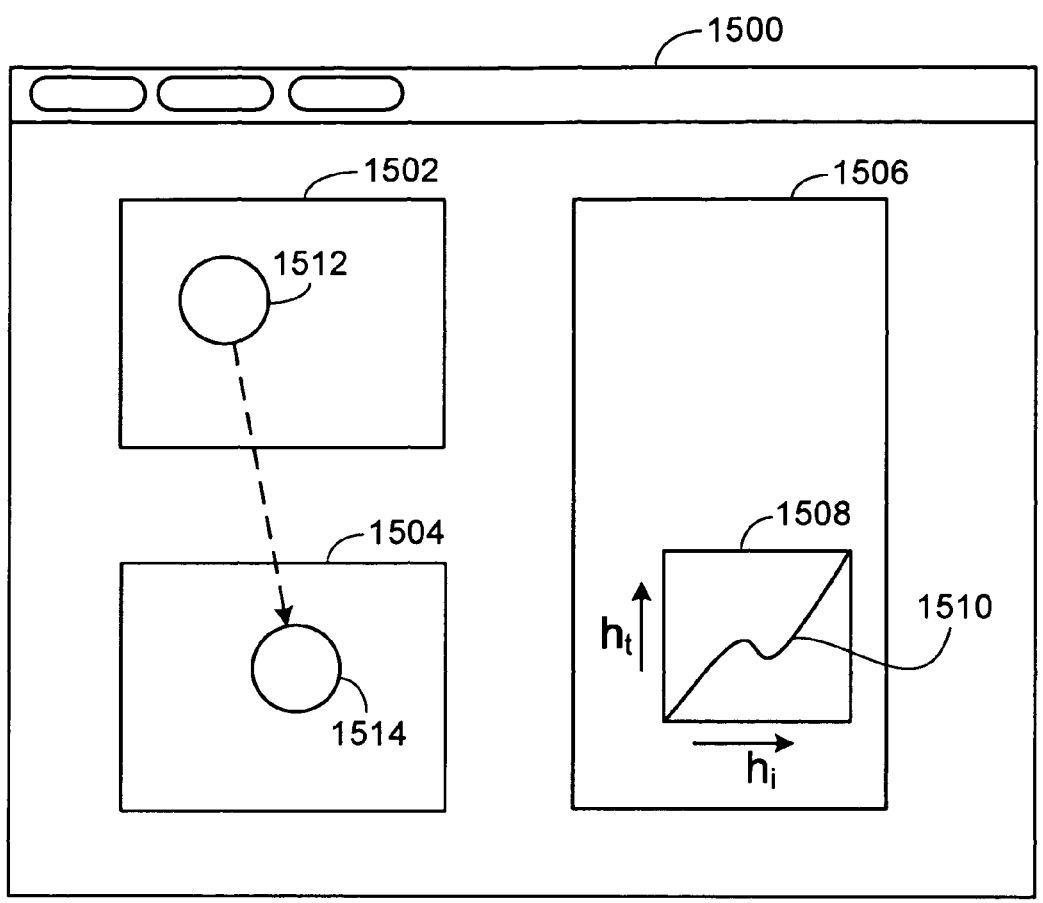

The color gamut of the liquid crystal display (represented by matrices 730, 732, 734) confines the outer ranges of the user-preferred color gamut, and the mapping matrices 720, 722, and 724 determine the distribution of colors on the user-preferred color gamut. Given the color gamut boundary of the color slide film and the final target color gamut boundary, the colors of the image can be mapped using the process 1400 (FIG. 14).

When mapping internal points that are enclosed in a tetrahedron, control points can be positioned within the tetrahedron so that different regions within the tetrahedron have different mappings schemes.

Figure 8:
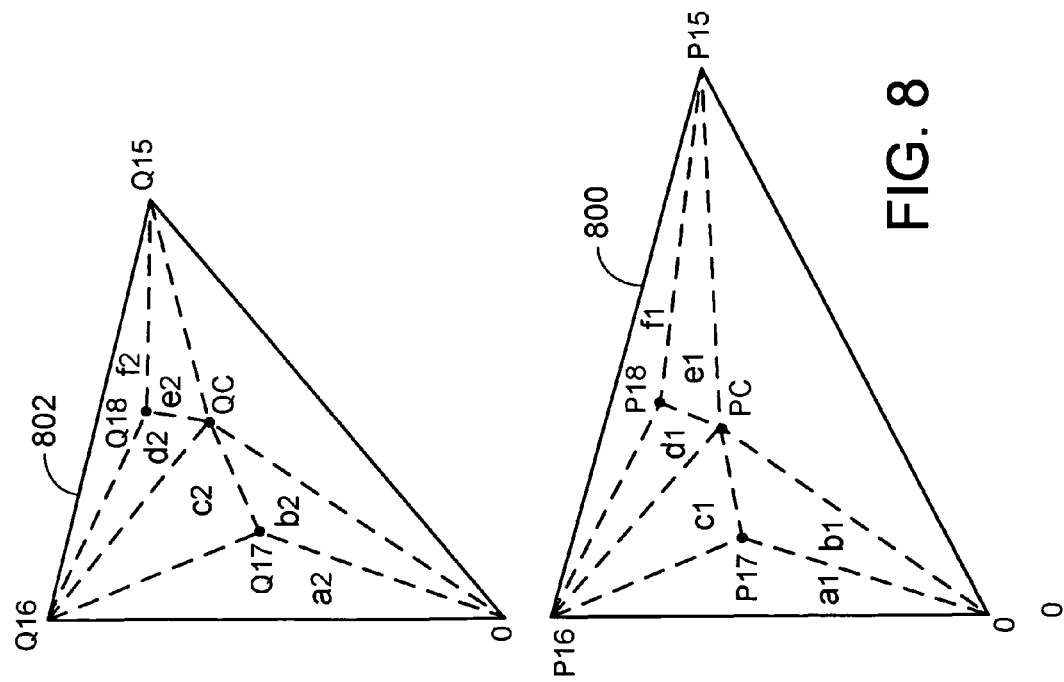

FIG. 8 shows an example of mapping of internal points P17 and P18 in a first color gamut 800 (represented by a triangle O-P15-P16) to a second color gamut 802 (represented by a triangle O-Q15-Q16) in a two-dimensional color space. A control point PC in the color gamut 800 is used to divide the triangle O-P15-P16 into three smaller triangles: O-PC-P16, O-PC-P15, and PC-P15-P16. The control point PC is mapped to a control point QC in color gamut 802, which is used to divide the triangle O-Q15-Q16 into three smaller triangles O-QC-Q16, O-QC-Q15, and QC-Q15-Q16.

To map the initial point P17 to a target point Q17, the area ratios are preserved so that $$a1:b1:c1=a2:b2:c2,\qquad\text{Equ. 2}$$

where a1 is the area of triangle O-P17-P16, b1 is the area of triangle O-PC-P17, c1 is the area of triangle PC-P16-P17, a2 is the area of triangle O-Q17-Q16, b2 is the area of triangle O-QC-Q17, and c2 is the area of triangle QC-Q16-Q17. Similarly, the initial point P18 is mapped to a target point Q18 by satisfying the relationship d1:e1:f1=d2:e2:f2, where d1 is the area of triangle PC-P16-P18, e1 is the area of triangle PC-P15-P18, f1 is the area of triangle O-P15-P18, d2 is the area of triangle QC-Q16-Q18, e2 is the area of triangle QC-Q15-Q18, and f2 is the area of triangle O-Q15-Q18.

Because the mapping of P17 and P18 depend on different reference points (e.g., the vertices of the triangles enclosing P17 and P18 are different), their mapping schemes may also be different. For example, assuming that P15 does not coincide with Q15, then Q18 will not have the same coordinates as P18 after the mapping. On the other hand, if Pl6 coincides with Q16, and PC coincides with QC, then the internal points (e.g., P17) in a triangle O-PC-P16 will not change coordinates after the mapping. In other words, the colors falling within the triangle O-PC-P16 will be the same whether being displayed on a medium having the first color gamut 800 or a medium having the second color gamut 802.

An advantage of using control points is that certain colors can be preserved during the color gamut mapping process. For example, one or more control points may be used to preserve the colors that occur in nature. When images having scenes or objects that occur in nature (e.g., trees, grass, rocks, animal, sky, ocean, fruits, human skin) are displayed on different media, the colors of the naturally occurring scenes or objects will remain the same, resulting in a more naturally-looking image.

FIG. 8 shows the mapping of points in a two-dimensional color space in which control points are used to alter the mapping scheme of different regions of the color space, or to preserve the colors within certain regions of the color space. The same principle can be applied to mapping points in three-dimensional color space.

Figure 9A:
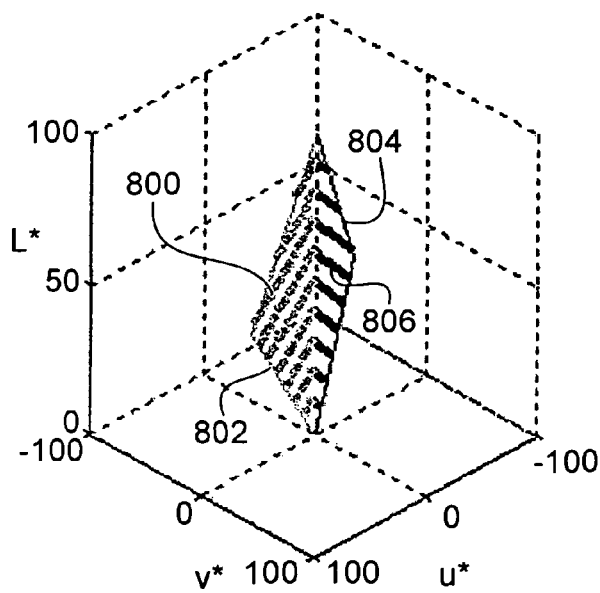
Figure 9C:
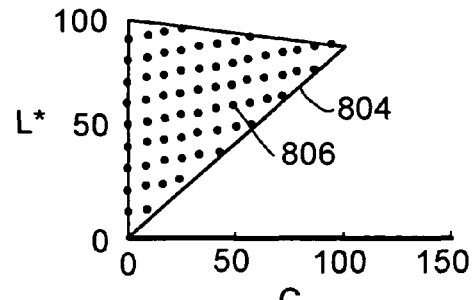
Figure 9B:
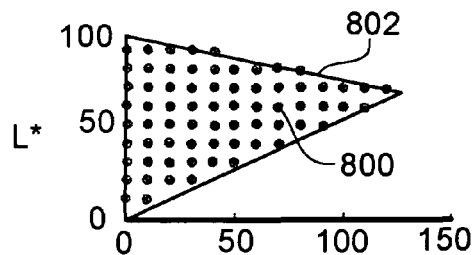

FIG. 9A shows a mapping of initial points 800 from a first color gamut 802 to target points 806 a second color gamut 804. FIG. 9B shows the initial points 800 in the first color gamut 802, and FIG. 9C shows the target points 806 in the second color gamut 804. No control points are used. Thus, the mapping from the initial to target points is uniform.

Figure 10A:
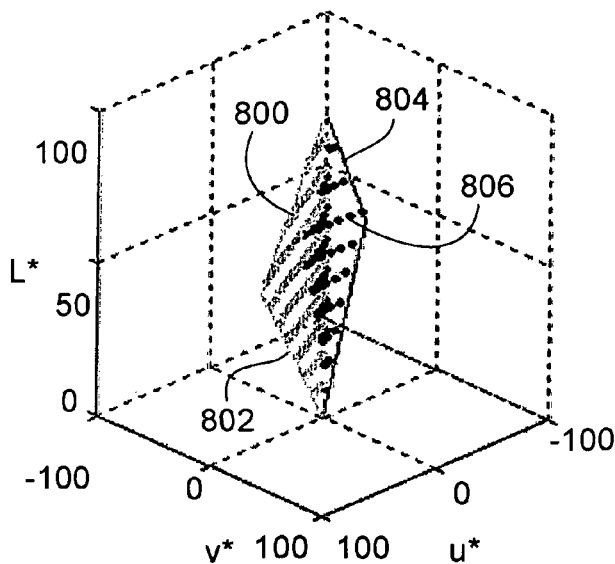
Figure 10C:
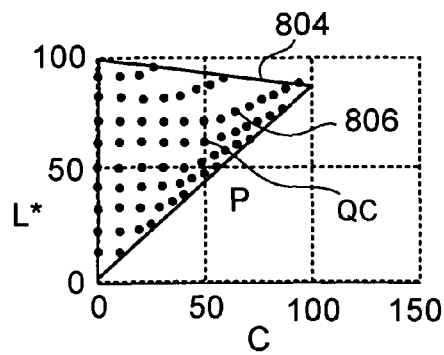
Figure 10B:
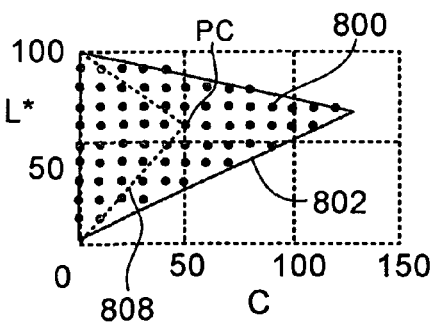

FIG. 10A shows a mapping of the internal points 800 in the first color gamut 802 to target points 806 in the second color gamut 804, in which a control point PC is positioned at (L, C)=(60, 50) in the first color gamut 802, and a corresponding control point QC is positioned at (L, C)=(60, 50) in the second color gamut 804. FIG. 10B shows the initial points 800 in the first color gamut 802, which are the same as those in FIG. 9B. FIG. 10C shows the target points 806 in the second color gamut 804. In FIG. 10C, initial points within a triangle 808 having vertices at 0, (L, C)=(100, 0), and (L, C)=(60,50) are mapped differently than points outside of the triangle 808.

Figure 11:
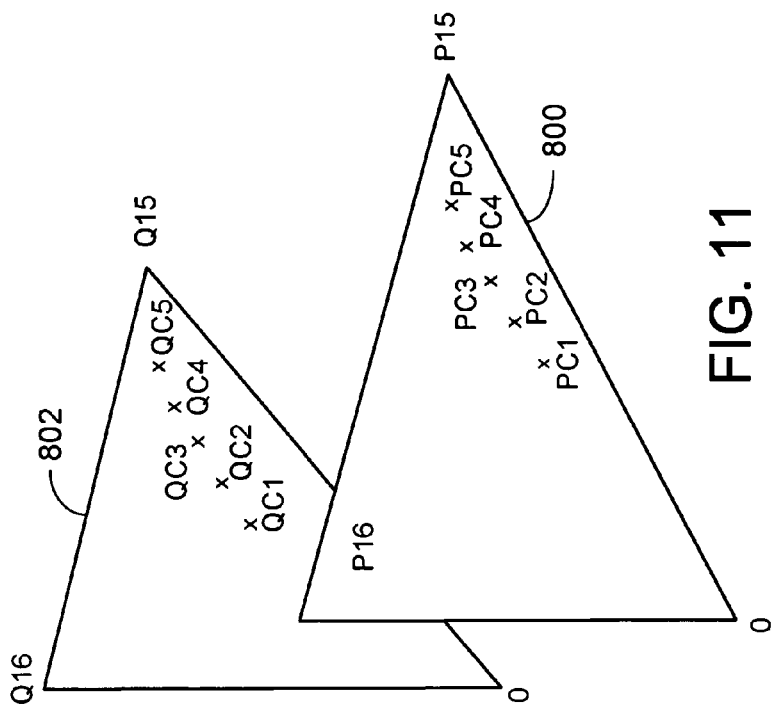

FIG. 11 shows an example in which multiple control points, PC1 to PC5, are positioned in the initial color gamut 800, and control points QC1 to QC5 are positioned in the target color gamut 802, to achieve a particular color transition effect To map an initial point in color gamut 800 to a target point in color gamut 802, three reference points are selected from the set of points {0, P15, P16, PC1, PC2, PC3, PC4, PC5} such that the initial point is enclosed by the triangle have vertices at the three reference points. The initial point is then mapped to the target point based on the triangulation method described above.

In one example, mapping of color gamut in three-dimensional space can be performed by sampling two-dimensional color gamut boundaries when hue is held constant at different values, then perform mapping of internal points using reference points that are determined based on the sampled two-dimensional color gamut boundaries.

FIG. 12 shows a two-dimensional initial color gamut boundary 1200 and a target color gamut boundary 1202 for a particular hue value. Five reference points are selected from the boundary 1200. The first reference point P18 has the largest chroma value ($C_{max}$) in the color gamut boundary 1200. The second reference point P19 has the largest luminance value ($L_{max}$). The third reference point P20 has 5% of $L_{max}$ and has a chroma value slightly larger than the boundary point P22 having the same luminance value. The fourth reference point P21 has 95% of $L_{max}$ and has a chroma value slightly larger than the boundary point P22 having the same luminance value. The fifth reference point is the origin O.

The third and fourth reference points are selected to have slightly larger chroma values so that most internal points of the color gamut can be enclosed by triangles defined by three of the five reference points.

Five reference points (Q18, Q19, Q22, Q21, and O) for the target color gamut 1202 are determined in a similar manner.

For each initial point (e.g., P24) that is to be mapped to the target color gamut 1202, three reference points are selected such that the three reference points define a triangle that encloses the initial point. In this example, the three reference points for P24 are P18, P20, and P21. Three corresponding reference points are selected in the color gamut 802. Here, the corresponding reference points are Q18, Q20, and Q21. The target point Q24 is determined so that Equ. 2 is satisfied.

Similar mapping can be performed on two-dimensional color gamuts for other hue values.

Figure 13:
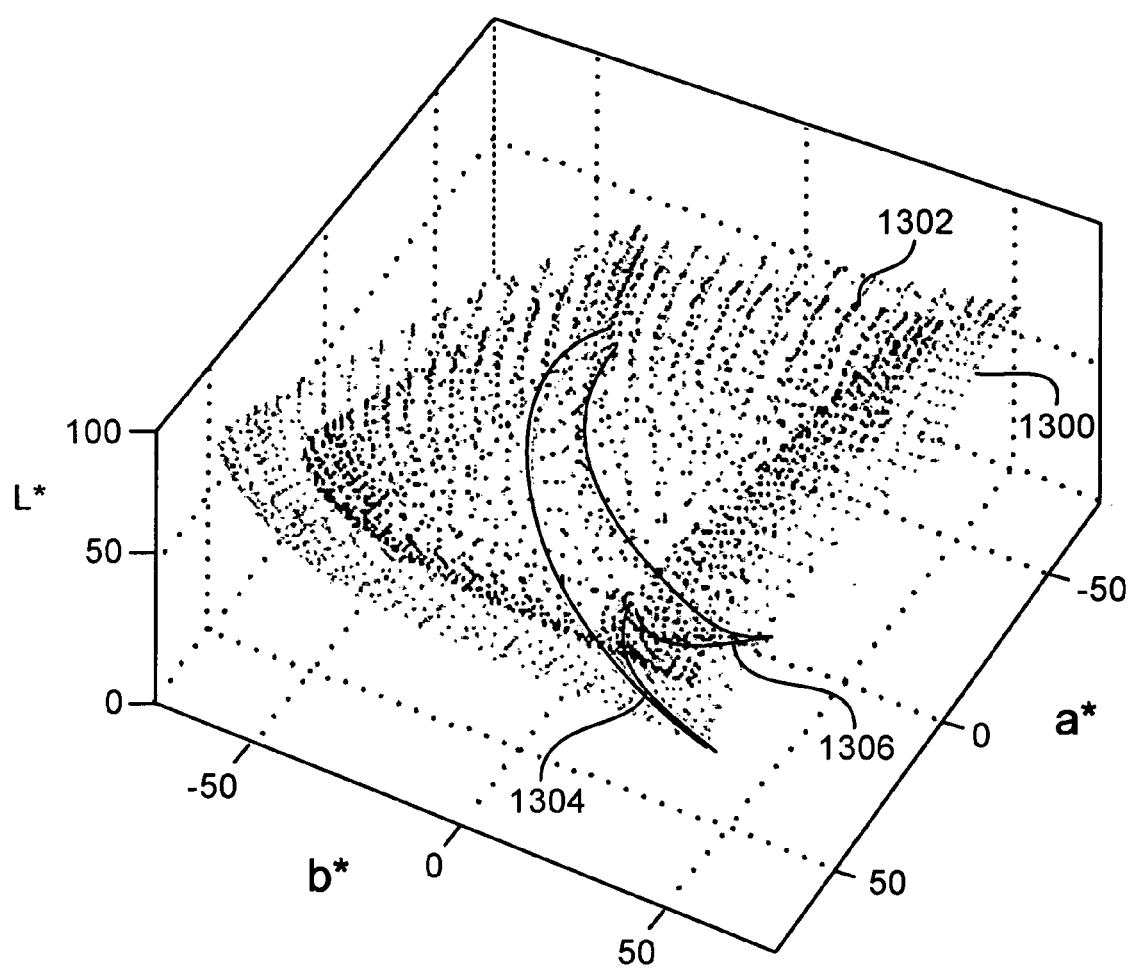

FIG. 13 shows an example in which an initial color gamut boundary 1300 (represented by lighter dots) are mapped to a target color gamut boundary 1302 (represented by darker dots) of a particular liquid crystal display. The mapping is designed so that red color hues (represented by a line 1304 on the initial color gamut boundary 1300) is mapped to reddish orange color hues (represented by a line 1306 on the target color gamut boundary 1302). The other hues are preserved during the mapping.

In the example shown in FIG. 13, luminance, chroma, and hue values are simultaneously transformed in a uniform manner. The distribution of luminance values is kept uniform, the chroma values are reduced, and the hue values are maintained except for the shift from red to reddish orange color. Lines 1304 and 1306 are mostly smooth and continuous, meaning that most colors having similar luminance, chroma, or hue values will also have similar values in the other two coordinates.

Although some examples have been discussed above, other implementations and applications are also within the scope of the following claims. For example, instead of using an L-C-H coordinate system, the color space can use a red-green-blue (RGB) coordinate system, a cyan-magenta-yellow (CMY) coordinate system, a CIELAB coordinate system, or any other coordinate system. The color gamut boundary can be sampled with a lower resolution, such as using 100×100 sample points, to reduce data processing time.

Figure 5:
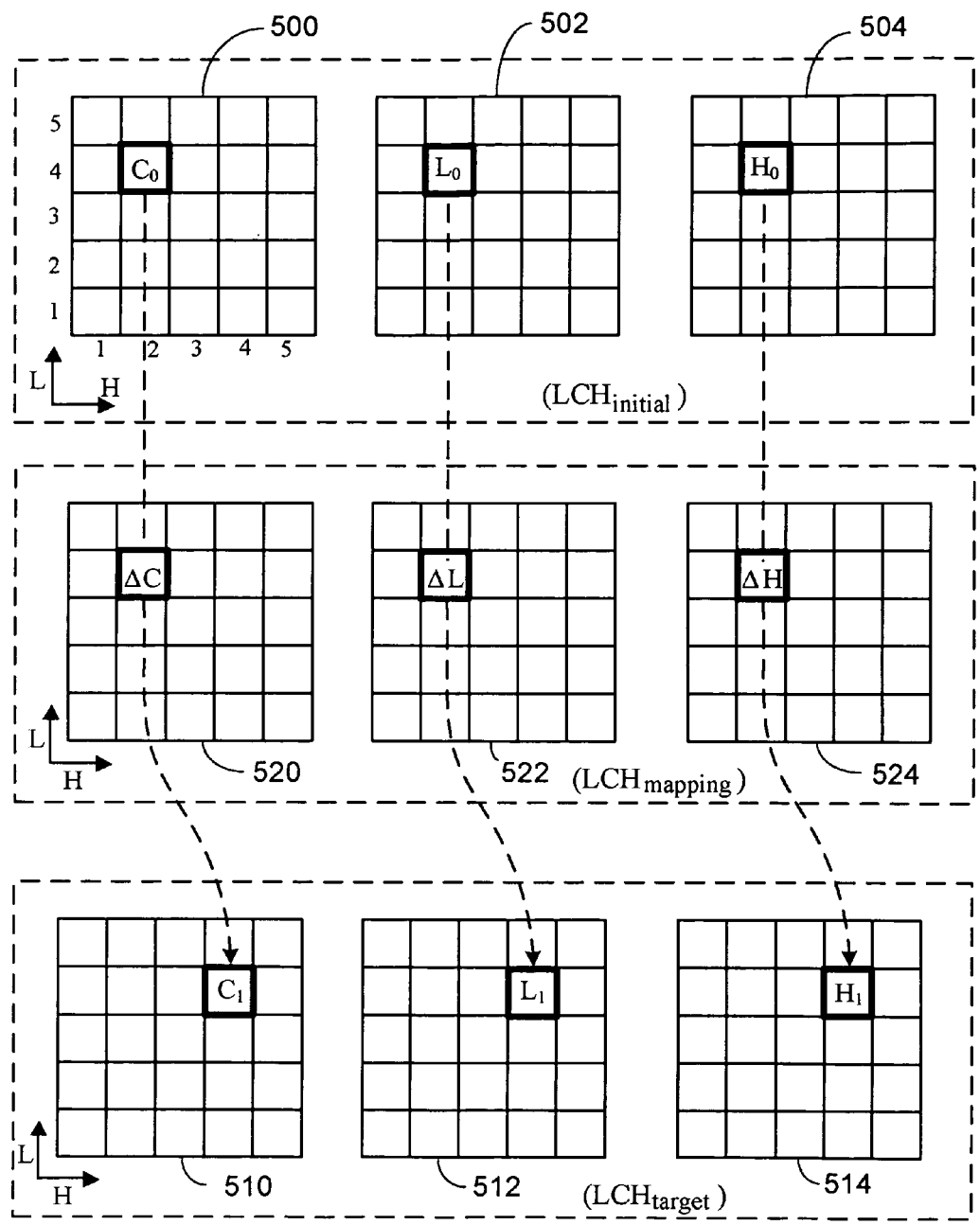

In FIG. 5, the mapping matrices 520, 522, and 524 store differences between the chroma, luminance, and hue values of initial and target points. The mapping matrices can be replaced by functions of the luminance, chroma, and hue values. The functions can be linear, piece-wise linear, or non-linear functions of luminance, chroma, and hue values. For example, the mapping matrix 520 can be replaced by a mapping function $$F_C(C_{initial}, L_{initial}, H_{initial}) = \begin{cases} C_{initial}(x, y) & \ldots \text{ if } h1 \leq H_{initial}(x, y) \leq h2 \\ 0.5 \times C_{initial}(x, y) & \ldots \begin{array}{l} \text{if } 0 \leq H_{initial}(x, y) < h1, \\ \text{or } h2 < H_{initial}(x, y) \leq 1 \end{array} \end{cases}$$

which reduces the chroma value by half if the hue value is in the range of h1 and h2, but otherwise preserves the chroma value. For example, the mapping matrix 522 can be replaced by a mapping function $$F_L(C_{initial}, L_{initial}, H_{initial}) = 0.7 \times L_{initial}(x, y),$$

which reduces luminance values by 30%. For example, the mapping matrix 524 can be replaced by a mapping function $$F_H(C_{initial}, L_{initial}, H_{initial}) = \begin{cases} H_{initial}(x, y) + 0.2 & \ldots \text{ if } h1 \leq H_{initial}(x, y) \leq h2 \\ H_{initial}(x, y) & \ldots \begin{array}{l} \text{if } 0 \leq H_{initial}(x, y) < h1, \\ \text{or } h2 < H_{initial}(x, y) \leq 1 \end{array} \end{cases}$$

which has the effect of increasing hue values in the range of h1 and h2 by 0.2 and preserving other hue values. More complex functions can be used.

The color mapping process described above can be used to map the colors of an image to match the color gamuts of various devices or medium, for example, a cathode ray tube display, a plasma display, a projection display, an organic light emitting diode display, a inkjet color printer, a laser color printer, color printing paper, and color films. The color mapping process described above can also be used to map the color gamut of an image source (e.g., a digital camera or a scanner) to a particular color space used by an image processing software.

The color mapping process can also be used to calibrate a device or medium so that it exhibits natural and accurate colors. For example, a liquid crystal display or an organic light emitting diode may degrade over time and show colors that are not consistent with its original design. A calibration system can be used to test the various colors exhibited by the display, and adjust the output of the display to compensate for the degradation. Color gamut mapping can be used to map a current color gamut of the display and an adjusted color gamut such that colors mapped to the adjusted color gamut will be shown accurately on the display.

In one example, when generating the matrices 500, 502, 504, 510, 512, and 514, if more than one sample point corresponds to a cell, the sample point with largest chroma value is used. The initial, intrinsic, and target color gamuts can be user-specified color gamuts. For example, the standard RGB color gamut can be the intrinsic target color gamut. A range of colors of a particular image can be the initial color gamut. A user-preferred color zone can be the initial color gamut.

We claim:

1. A method comprising:
    at a computer, converting coordinates of source reference points in a color space to coordinates of destination reference points in the color space; and
    at the computer, converting coordinates of an initial point to coordinates of a target point based on a first relationship among a first set of volumes and a second relationship among a second set of volumes, the initial point being different from the source reference points, the target point being different from the destination reference points,
    the first set of volumes being defined at least in part by the initial point and at least a subset of the source reference points, the second set of volumes being defined at least in part by the target point and at least a subset of the destination reference points.

2. The method of claim 1 in which the first set of volumes are associated with polyhedrons that have a common vertex at the initial point.

3. The method of claim 2 in which the source reference points comprise three reference points, and at least one of the polyhedrons associated with the first set of volumes comprises a tetrahedron having vertices that coincide with the initial point and a source reference point.

4. The method of claim 2 in which the first relationship represents ratios of volumes of the polyhedrons that have a common vertex at the initial point.

5. The method of claim 4 in which the second set of volumes are associated with polyhedrons that have a common vertex at the target point.

6. The method of claim 5 in which the second relationship represents ratios of volumes of the polyhedrons that have a common vertex at the target point.

7. The method of claim 6 in which the ratios of volumes of the polyhedrons that have a common vertex at the initial point are substantially equal to ratios of volumes of the polyhedrons that have a common vertex at the target point.

8. The method of claim 6 in which the polyhedrons that have a common vertex at the target point comprise a fifth polyhedron, a sixth polyhedron, a seventh polyhedron, and an eighth polyhedron, and the second relationship represents v5: v6: v7: v8, wherein v5 represents the volume of the fifth polyhedron, v6 represents the volume of the sixth polyhedron, v7 represents the volume of the seventh polyhedron, and v8 represents the volume of the eighth polyhedron.

9. The method of claim 4 in which the polyhedrons that have a common vertex at the initial point comprise a first polyhedron, a second polyhedron, a third polyhedron, and a fourth polyhedron, and the first relationship represents v1: v2: v3: v4, wherein v1 represents the volume of the first polyhedron, v2 represents the volume of the second polyhedron, v3 represents the volume of the third polyhedron, and v4 represents the volume of the fourth polyhedron.

10. The method of claim 2 in which each of the polyhedrons has vertices that coincide with the initial point and at least some of the source reference points.

11. The method of claim 1 in which the initial point belongs to a source color gamut, and the target point belongs to a destination color gamut.

12. The method of claim 11 in which the first color gamut represents a range of luminance, chroma, and hue of an image source.

13. The method of claim 11 in which the second color gamut represents a range of luminance, chroma, and hue that can be reproduced by one of a display and a printer.

14. The method of claim 1 in which the source reference points are positioned on a boundary of a source color gamut.

15. The method of claim 14 in which the destination reference points are positioned on a boundary of a destination color gamut.

16. The method of claim 15 in which the coordinates of the source reference points are converted to the coordinates of the destination reference points based on a predetermined mapping between a boundary of the source color gamut and a boundary of the destination color gamut.

17. The method of claim 16 in which the source color gamut substantially overlaps the destination color gamut.

18. The method of claim 1, further comprising providing a first matrix to represent data points on a boundary of a source color gamut.

19. The method of claim 18, further comprising providing a second matrix to represent data points on a boundary of a destination color gamut.

20. The method of claim 19, further comprising providing a third matrix to store mapping information about mapping of data points represented by the first matrix to data points represented by the second matrix.

21. The method of claim 20 in which the source reference points belong to a subset of data points represented by the first matrix, the destination reference points belong to a subset of data points represented by the second matrix, and the coordinates of the initial point are converted to coordinates of the target point based on the mapping information stored in the third matrix.

22. The method of claim 18 in which the first matrix comprises a two-dimensional array of chroma values, in which indices of the rows of the matrix represent luminance values, and indices of the columns of the matrix represent hue values.

23. The method of claim 1 in which at least one of the source reference points coincide with one of the destination reference points.

24. The method of claim 1 in which the source reference points comprise surface reference points and internal reference points, the surface reference points coinciding with vertices of a convex hull of all of the source reference points, the internal reference points being within the convex hull and dividing the convex hull into a first set of polyhedrons each having a vertex that coincides with at least one internal reference point.

25. The method of claim 24 in which the first set of volumes are associated with a second set of polyhedrons having a common vertex at the initial point, the second set of polyhedrons being enclosed by the first set of polyhedrons.

26. The method of claim 1 in which the color space uses one of a red-green-blue (RGB) coordinate system, a cyan-magenta-yellow (CMY) coordinate system, a CIELAB coordinate system, and a luminance-chroma-hue (LCH) coordinate system.

27. The method of claim 1 in which the source reference points comprise a first source reference point, a second source reference point, and a third source reference point,
the first set of volumes comprise a first volume, a second volume, a third volume, and a fourth volume,
the first volume is associated with a first polyhedron having vertices that coincide with the initial point, the first source reference point, the second source reference point, and an origin,
the second volume is associated with a second polyhedron having vertices that coincide with the initial point, the first source reference point, the third source reference point, and the origin,
the third volume is associated with a third polyhedron having vertices that coincide with the initial point, the second source reference point, the third source reference point, and the origin, and
the fourth volume is associated with a fourth polyhedron having vertices that coincide with the initial point, the first source reference point, the second source reference point, and the third source reference point.

28. The method of claim 27 in which the destination reference points comprise a first destination reference point, a second destination reference point, and a third destination reference point,
the second set of volumes comprise a fifth volume, a sixth volume, a seventh volume, and an eighth volume,
the fifth volume is associated with a fifth polyhedron having vertices that coincide with the target point, the first destination reference point, the second destination reference point, and an origin,
the sixth volume is associated with a sixth polyhedron having vertices that coincide with the target point, the first destination reference point, the third destination reference point, and the origin,
the seventh volume is associated with a seventh polyhedron having vertices that coincide with the target point, the second destination reference point, the third destination reference point, and the origin, and the eighth volume is associated with a eighth polyhedron having vertices that coincide with the target point, the first destination reference point, the second destination reference point, and the third destination reference point.

29. The method of claim 1 in which the source reference points are associated with a color gamut of a source display medium, and the destination reference points are associated with a color gamut of a destination display medium.

30. The method of claim 29 in which the initial point represents an initial color in the color gamut of the source display medium, and the target point represents a target color in the color gamut of the destination display medium.

31. The method of claim 1 in which the first set of volumes are associated with regions defined by the initial point and at least some of the source reference points.

32. The method of claim 1 in which the second set of volumes are associated with regions defined by the initial point and at least some of the destination reference points.

33. A machine-accessible medium, which when accessed results in a machine performing operations comprising:

converting coordinates of source reference points in a color space to coordinates of destination reference points in the color space; and converting coordinates of an initial point to coordinates of a target point based on a first relationship among a first set of volumes and a second relationship among a second set of volumes, the initial point being different from the source reference points, the target point being different from the destination reference points, the first set of volumes being defined at least in part by the initial point and at least a subset of the source reference points, the second set of volumes being defined at least in part by the target point and at least a subset of the destination reference points.

* * * * *